US007873318B2

(12) United States Patent
Nagai et al.

(10) Patent No.: US 7,873,318 B2
(45) Date of Patent: Jan. 18, 2011

(54) RADIO-FREQUENCY COMMUNICATION DEVICE

(75) Inventors: Takuya Nagai, Nagoya (JP); Kentaro Ushiyama, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 790 days.

(21) Appl. No.: 11/559,302

(22) Filed: Nov. 13, 2006

(65) Prior Publication Data

US 2007/0072567 A1 Mar. 29, 2007

Related U.S. Application Data

(63) Continuation-in-part of application No. PCT/JP2005/007343, filed on Apr. 15, 2005.

(30) Foreign Application Priority Data

May 14, 2004 (JP) ............................. 2004-145298
Jun. 28, 2004 (JP) ............................. 2004-190098

(51) Int. Cl.
*H04B 1/00* (2006.01)

(52) U.S. Cl. .................... 455/63.1; 455/106; 455/277.2

(58) Field of Classification Search ................... 455/39, 455/73, 91, 130, 89, 63.1; 375/295, 316, 375/353
See application file for complete search history.

(56) References Cited

U.S. PATENT DOCUMENTS 5,305,008 A * 4/1994 Turner et al. .................. 342/44
5,774,795 A * 6/1998 Ando ......................... 455/106
6,201,955 B1 * 3/2001 Jasper et al. ............ 455/277.2

FOREIGN PATENT DOCUMENTS

| | | | |
|---|---|---|---|
| JP | 02083482 | A | 3/1990 |
| JP | H5-128289 | A | 5/1993 |
| JP | H8-122429 | A | 5/1996 |
| JP | H9-200154 | A | 7/1997 |

(Continued)

OTHER PUBLICATIONS

International Preliminary Report on Patentability, mailed Nov. 23, 2006, on Written Opinion of counterpart international application PCT/JP2005/007343.

(Continued)

*Primary Examiner*—Duc Nguyen
*Assistant Examiner*—Ajibola Akinyemi
(74) *Attorney, Agent, or Firm*—Baker Botts L.L.P.

(57) ABSTRACT

A radio-frequency communication device arranged to transmit a transmitted signal from a transmitter antenna device toward a communication object, and to receive through a receiver antenna device a reply signal transmitted from the communication object, for radio communication with the communication object, the radio-frequency communication device including a transfer-function calculating portion operable to calculate a transfer function indicative of a relationship between a signal input to the transmitter antenna device and a signal generated by the receiver antenna device due to the signal input to the transmitter antenna device, and a receiver-circuit-constant setting portion operable to set a receiver-circuit constant for improving a quality of the reply signal received by the receiver antenna device, on the basis of the transfer function calculated by the transfer-function calculating portion, and the signal input to the transmitter antenna device.

26 Claims, 18 Drawing Sheets

FOREIGN PATENT DOCUMENTS

| | | | |
|---|---|---|---|
| JP | 10062518 | A | 3/1998 |
| JP | 10224277 | A | 8/1998 |
| JP | 2000-156657 | A | 6/2000 |
| JP | 2000-286772 | A | 10/2000 |
| JP | 2002-15288 | A | 1/2002 |
| JP | 2002-152065 | A | 5/2002 |
| JP | 2002-530998 | A | 9/2002 |
| JP | 2003-143047 | A | 5/2003 |
| JP | 2003-264492 | A | 9/2003 |
| JP | 2003-273831 | A | 9/2003 |
| JP | 2004048202 | A | 2/2004 |

OTHER PUBLICATIONS

Japanese Office Action mailed on Mar. 13, 2008, in corresponding Japanese Patent Application No. 2004-190098.

International Search Report (International Patent Application No. PCT/JP2005/007343—counterpart to above-captioned patent application), mailed Aug. 9, 2005.

* cited by examiner

RADIO-FREQUENCY COMMUNICATION DEVICE

The present application is a Continuation-in-Part of International Application No. PCT/JP2005/007343 filed Apr. 15, 2005, which claims the benefits of Japanese Patent Applications No. 2004-145298 filed May 14, 2004 and No. 2004-190098 filed Jun. 28, 2004.

BACKGROUND OF THE INVENTION

1. Field of the Invention

The present invention relates in general to a radio-frequency communication device operable to transmit and receive information to and from a desired communication object, and more particularly to techniques for eliminating an influence of a transmitter side of the device on a receiver side of the device.

2. Description of the Related Art

In various fields of data communication, there are used radio-frequency communication devices arranged to transmit transmitted signals toward desired communication objects, and to receive received signals transmitted from the communication objects in response to the transmitted signals, for thereby effecting communication with the communication objects. As one form of the radio-frequency communication devices, there is known a radio-frequency tag communication device (interrogator) operable for radio communication with small-sized radio-frequency tags (transponders) which store desired information. These radio-frequency tags and radio-frequency tag communication device constitute a so-called RFID (radio-frequency identification) system wherein articles to which the radio-frequency tags are affixed are identified by non-contact information reading and writing through electric waves. The information stored in the communication objects in the form of the radio-frequency tags can be read out by radio communication of the radio-frequency tag communication device with the radio-frequency tags, even where the radio-frequency tags are soiled or located at invisible places. The RFID system is expected to be used in various fields such as management and inspection of commodities.

The radio-frequency tags are labels each having a radio-frequency circuit element bonded thereto. The radio-frequency circuit element includes an IC circuit portion storing desired tag information, and an antenna which is connected to the IC circuit portion and arranged to transmit and receiver information. When a transmitted wave is transmitted from a transmitter antenna of a reader/writer functioning as the interrogator or radio-frequency tag communication device, toward the radio-frequency tag functioning as the transponder, the radio-frequency circuit element of the radio-frequency tag which has received the transmitted wave is activated with an energy of the received transmitted wave to transmit a reply wave. Namely, the reader/writer receives through its receiver antenna the reply wave from the radio-frequency tag as soon as the reader/writer has transmitted the transmitted wave. In this respect, it is noted that the amounts of attenuation of electric waves transmitted and received through the transmitter and receiver antennas (degree of separation of the transmitted and received waves or signals) are limited, so that a part of the transmitted wave is inevitably received by the receiver antenna, as an interfering leakage signal mixed in the reply wave transmitted from the radio-frequency tag. Thus, the transmitted wave or signal disturbs the reception of the reply wave or signal.

To solve the problem of the interfering leakage signal described above, it has been proposed to generate a cancel signal (compensating signal) for offsetting or canceling the unnecessary interfering leakage signal to be mixed in the reply wave, upon transmission of the transmitted wave, and to combine together the generated cancel signal and the unnecessary interfering leakage signal. JP-8-122429 A discloses an example of this conventional technique, wherein a device to identify mobile objects is provided with an interference compensating device. This interference compensating device includes a variable phase shifter and a variable attenuator for adjusting the phase and amplitude of the leakage signal which is a part of the transmitted wave, and a multiplexer for combining together a cancel signal generated by the phase and amplitude adjustment of the leakage signal, and the input to the receiver antenna, for thereby offsetting or canceling the unnecessary leakage signal. To generate the cancel signal, the variable phase shifter and the variable attenuator are manually adjusted so as to minimize the level of a composite signal obtained by combining together the cancel signal and the leakage signal which are generated while no reply wave is received from the transponders in response to the transmitted wave. To deal with a change of the unnecessary leakage signal changes due to aging deterioration of the variable phase shifter and attenuator, these variable phase shifter and attenuator are manually re-adjusted at a regular interval, for example, once per year.

There have been proposed techniques for enlarging the area of communication of the radio-frequency communication device. JP-5-128289 A discloses an example of such techniques, namely, a millimeter wave information reading system. This system uses an array antenna consisting of a plurality of antenna elements, and is arranged to control the phase of the transmitted signal transmitted from each of the antenna elements, and the phase of the received signal received by each antenna element, that is, to effect phased-array processing for transmission of the transmitted signal and reception of the received signal.

However, the conventional techniques described above have the following problems, in view of increasing introduction of the RFID system into various fields of industry. Namely, in the field of searching for desired articles of commodity within a warehouse, for example, radio communication between the interrogator and the transponders is adversely influenced by moving persons or metallic bodies, or existence of metallic bodies. Described in detail, the increasing introduction of the RFID system into the various fields of industry causes an increase of an influence of a change of the operating environment of the RFID system on the communication between the interrogator and the transponders, resulting in a considerable change of the condition in which the unnecessary leakage signal is generated from the transmitted signal or wave. According to the conventional technique wherein the cancel signal is optimized by manual adjustment of the variable shifter and attenuator, only a regular re-adjustment of the variable phase shifter and attenuator can be relied upon to deal with a change of the unnecessary leakage signal after the optimization of the cancel signal. Thus, it has been difficult to deal with a change of the operating environment of the RFID system in a real-time fashion, for sufficiently canceling the interfering leakage signal with the suitably adjusted cancel signal, to maintain a high degree of reception sensitivity of the interrogator or radio-frequency communication device.

The conventional techniques have another problem that the influence of the transmitted signal on the reception of the received signal changes each time the direction of transmission of the transmitted signal is changed. That is, a part of the transmitted signal transmitted from the radio-frequency communication device is mixed as a leakage signal into the received signal received by the radio-frequency communication device, so that the communication between the radio-frequency communication device and the communication object is adversely influenced by the leakage signal. Therefore, the leakage signal must be eliminated. However, the change of the direction of transmission of the transmitted signal causes a change of the influence of the leakage signal on the received signal, so that it is difficult to sufficiently eliminate the influence of the leakage signal. Namely, there has been a need of developing a radio-frequency communication device which can eliminate an influence of the transmitted signal on the reception of the received signal, according to a change of the direction of transmission of the transmitted signal.

SUMMARY OF THE INVENTION

The present invention was made in view of the background art described above. Accordingly, it is an object of the present invention to provide a radio-frequency communication device which can effectively eliminate an influence of the transmitted signal on the reception of the received signal, according to a change of the direction of transmission of the transmitted wave and a change of the operating environment of the device.

The object indicted above may be achieved according to a first aspect of this invention, which provides a radio-frequency communication device arranged to transmit a transmitted signal from a transmitter antenna device toward a communication object, and to receive through a receiver antenna device a reply signal transmitted from the communication object, for radio communication with the communication object, the radio-frequency communication device comprising: a transfer-function calculating portion operable to calculate a transfer function indicative of a relationship between a signal input to the transmitter antenna device and a signal generated by the receiver antenna device due to the signal input to the transmitter antenna device; and a receiver-circuit-constant setting portion operable to set a receiver-circuit constant for improving a quality of the reply signal received by the receiver antenna device, on the basis of the transfer function calculated by the transfer-function calculating portion, and the signal input to said transmitter antenna device.

According to the first aspect of this invention described above, the radio-frequency communication device comprises the transfer-function calculating portion operable to calculate the transfer function indicative of the relationship between the signal input to the transmitter antenna device in the form of the transmitter/receiver antenna elements and the signal generated by the receiver antenna device due to the signal input to said transmitter antenna device, and the receiver-circuit-constant setting portion 62 (step SB2) operable to set the receiver-circuit constant for improving the quality of the reply signal received by the receiver antenna device, on the basis of the transfer function calculated by the transfer-function calculating portion, and the signal input to the transmitter antenna device. Accordingly, by obtaining the transfer function before radio communication with the communication object, the receiver-circuit constant can be set while taking account of the leakage signal that is a part of the transmitted signal, which part is received by the receiver antenna, Thus, the present radio-frequency communication device is capable of effectively eliminating an influence of the transmitted signal on the reception of the reply signal according to a change of the operation to transmit the transmitted signal.

In a first preferred form of the above-described first aspect of the invention, the radio-frequency communication device further comprises a cancel-signal generating portion operable to generate the cancel signal for eliminating the leakage signal which is generated by the receiver antenna device due to transmission of the transmitted signal from the transmitter antenna device. The receiver-circuit-constant setting portion sets, as the received-circuit constant, a constant for determining the phase and the amplitude of the cancel signal. This arrangement makes it possible to effectively eliminate the leakage signal that is a part of the transmitted signal transmitted from the transmitter antenna device, which part is mixed in the reply signal received by the receiver antenna device.

In one advantages arrangement of the above-descried first preferred form, the radio-frequency communication device further comprises a carrier generating portion operable to generate a carrier wave of the transmitted signal, and the cancel-signal generating portion generates the cancel signal on the basis of the carrier wave generated by the carrier generating portion. Accordingly, the frequency of the carrier wave of the transmitted signal can be made equal to that of the cancel signal, so that the leakage signal mixed in the reply signal received by the receiver antenna device can be more effectively eliminated.

In a second preferred form of the first aspect of the invention, the radio-frequency communication device further comprises: a local-signal oscillator operable to generate a local signal; a local-signal adjusting portion operable to adjust a phase and an amplitude of the local signal generated by the local-signal oscillator, on the basis of a predetermined constant; and a frequency converting portion operable to convert a frequency of the reply signal received by the receiver antenna device, by combining together the local signal the phase and amplitude of which have been adjusted by the local-signal adjusting portion, and the reply signal. In this form of the invention, the receiver-circuit-constant setting portion sets, as the receiver-circuit constant, the constant on which basis of which the phase and amplitude of the local signal are adjusted by the local-signal adjusting portion. This arrangement permits effective elimination of the leakage signal mixed in the reply signal received by the receiver antenna device.

In one advantageous arrangement of the above-described second preferred form, the radio-frequency communication device further comprises a carrier generating portion operable to generate a carrier wave of the transmitted signal, and the local-signal oscillator generates the local signal on the basis of the carrier wave generated by the carrier generating portion. Accordingly, the frequency of the carrier wave of the transmitted signal can be made equal to that of the local signal, so that the leakage signal mixed in the reply signal received by the receiver antenna device can be more effectively eliminated.

In a third preferred form of the first aspect of the invention, the receiver antenna device consists of a plurality of transmitter antenna elements. In the radio-frequency tag communication device provided with the receiver antenna device consisting of the plurality of transmitter/receiver antenna elements, the receiver-circuit constant can be easily set, and the area of communication can be enlarged.

In a fourth preferred form of the first aspect of the invention, the receiver antenna device consists of a plurality of receiver antenna elements. In the radio-frequency tag communication device provided with the receiver antenna device consisting of the plurality of receiver antenna elements, the receiver-circuit constant can be easily set, and the area of communication can be enlarged.

In a fifth preferred form of the first aspect of the invention, the transmitter antenna device and the transmitter antenna device include at least one common transmitter/receiver antenna element. Accordingly, the required size of the radio-frequency tag communication device can be minimized.

In a sixth preferred form of the first aspect of the invention, the transmitter antenna device consists of a plurality of transmitter antenna elements for transmitting respective transmitted signals, and radio-frequency communication device further comprises a phased-array control portion operable to control a phase of each of the transmitted signals to be transmitted from the plurality of transmitter antenna elements, for thereby controlling a direction of transmission of the transmitted signals. Accordingly, the direction of transmission of the transmitted signals can be suitably controlled.

In one advantageous arrangement of the above-described sixth preferred form, the receiver-circuit-constant setting portion sets the receiver-circuit constant each time the direction of transmission of the transmitted signals is changed by the phased-array control portion In the radio-frequency communication device provided with the transmitter antenna device in the form of a phased-array antenna device, the receiver-circuit constant can be set as needed, so that the area of communication can be enlarged.

In a seventh preferred form of the first aspect of this invention, the transmitter antenna device consists of a plurality of transmitter antenna elements, and the receiver antenna device consists of a plurality of receiver antenna elements. Further, the transfer-function calculating portion calculates, as the transfer function, a value obtained by dividing a transmitted-signal component included in received signals received by the receiver antenna elements, by the predetermined transmitted signals to be transmitted from the transmitter antenna elements. Accordingly, the leakage signal that is a part of the transmitted signals which part is included in the received signals received by the receiver antenna elements can be effectively estimated.

In an eighth preferred form of the first aspect of this invention, the transfer-function calculating portion calculates the transfer function at a predetermined time interval. Accordingly, the receiver-circuit constant can be updated on the basis of the transfer function calculated as needed.

In a ninth preferred form of the first aspect of the invention, the radio-frequency communication device further comprises a received-signal-quality detecting portion operable to detect a quality of a received signal received by the receiver antenna device, and the transfer-function calculating portion calculates the transfer function, depending upon the quality of the received signal detected by the received-signal-quality detecting portion. Accordingly, the transfer function can be updated as needed.

In one advantageous arrangement of the above-described ninth preferred form, the received-signal-quality detecting portion detects, as the quality of the received signal, a strength (intensity) of the received signal while the reply signal transmitted from the communication object is not received by the receiver antenna device, and the transfer-function calculating portion calculates the transfer function when the strength of the received signal detected by the received-signal-quality detecting portion is equal to or higher than the predetermined threshold. Accordingly, the transfer function can be updated when the strength of the leakage signal included in the received signals is estimated to be comparatively high.

In a tenth preferred form of the first aspect of this invention, the receiver-circuit-constant setting portion sets the receiver-circuit constant each time the transfer-function calculating portion calculates the transfer function. Accordingly, the received-circuit constant can be set on the basis of the transfer function calculated last by the transfer-function calculating portion.

In an eleventh preferred form of the first aspect of this invention, the communication object is the radio-frequency tag operable to transmit the reply signal including predetermined information, in response to the transmitted signal transmitted from the transmitter antenna device. In this case, the radio-frequency communication device is a radio-frequency tag communication device which is operable to communicate with the radio-frequency tag and in which the influence of the transmitted signal on the reception of the received signal can be effectively eliminated according to a change of the direction of transmission of the transmitted signal.

The object indicated above may also be achieved according to a second aspect of the present invention, which provides A radio-frequency communication device comprising (a) a carrier output portion including a carrier generating portion operable to generate a carrier wave for obtaining an access to a transponder, and a carrier modulating portion operable to modulate the carrier wave generated by the carrier generating portion, the carrier output portion outputting the carrier wave from the carrier generating portion or the modulated carrier wave from the carrier modulating portion, (b) a carrier transmitting portion operable to transmit the carrier wave from the carrier generating portion toward the transponder, (c) a signal receiving portion operable to receive a signal transmitted from the transponder in response to the carrier wave received from the carrier output portion (d) a cancel-signal generating portion operable to generate a cancel signal for eliminating an unnecessary wave that is a part of the carrier wave transmitted from the carrier transmitting portion, which part is received by the signal receiving portion, (e) a signal-strength detecting portion operable to detect a strength of a received signal which is received by the signal receiving portion and from which the unnecessary wave is at least partially eliminated by the cancel signal generated by the cancel-signal generating portion, and (f) a cancel-signal control portion operable to control the carrier generating portion, the carrier transmitting portion and the cancel-signal generating portion, such that a phase and an amplitude of the cancel signal generated by the cancel-signal generating portion are changed and optimized, on the basis of the strength of the received signal which is detected by the signal-strength detecting portion when the received signal is received by the signal receiving portion while the carrier wave generated by the carrier generating portion is transmitted from the carrier transmitting portion, without transmission of the carrier wave modulated by the carrier modulating portion from the carrier transmitting portion.

According to the second aspect of this invention, the cancel-signal control portion is arranged to control the carrier generating portion, the carrier transmitting portion and the cancel-signal generating portion before the radio-frequency communication device initiates communication with the transponder. Described in detail, the cancel-signal control portion commands the carrier generating portion to generate the carrier wave, and commands the carrier transmitting portion to transmit the carrier wave generated by the carrier generating portion but not modulated by the carrier modulating portion. During the transmission of this carrier wave, a part of the carrier wave transmitted from the carrier transmitting portion is received as the unnecessary wave by the carrier receiving portion. This unnecessary wave is at least partially eliminated by the cancel signal generated by the cancel-signal generating portion. Since the modulated carrier wave is not transmitted toward the transponder during the operation of the cancel-signal control portion, a reply signal from the transponder is not received by the signal receiving portion. Accordingly, the received signal received by the signal receiving portion consists of the unnecessary wave. On the basis of the strength of the received signal detected by the signal-strength detecting portion, the cancel-signal control portion controls the cancel-signal generating portion to change the phase and amplitude of the cancel signal generated, until the phase and amplitude are changed to optimum values at which the detected strength of the received signal is minimized. Thus, the cancel-signal generating portion is automatically adjusted to optimize the phase and amplitude of the cancel signal before the radio-frequency communication device (interrogator) initiates communication with the transponder. Unlike the conventional manual adjustment at a regular interval (once a year, for example), this automatic adjustment of the cancel-signal generating portion can effectively eliminate the unnecessary wave in a real-time fashion even where the reception of the unnecessary wave by the signal receiving portion changes due to a change of the operating environment of the radio-frequency interrogator. Accordingly, the cancel signal adjusted by the cancel-signal control portion permits a high degree of sensitivity of reception of the reply signal from the transponder during communication with the transponder in which the carrier wave modulated by the carrier modulating portion is transmitted from the carrier output portion through the carrier transmitting portion toward the transponder.

In a first preferred form of the second aspect of this invention, the cancel-signal control portion changes the phase and amplitude of the cancel signal to optimum values, such that the strength of the received signal detected by the signal-strength detecting portion is minimized. In this form of the invention, the phase and amplitude of the cancel signal generated by the cancel-signal generating portion are optimized such that the detected strength of the received signal is minimized. Accordingly, the unnecessary wave can be effectively eliminated in the real-time fashion even where the reception of the unnecessary wave by the signal receiving portion changes due to a change of the operating environment of the radio-frequency communication device.

In one advantageous arrangement of the above-described first preferred form of the second aspect of this invention, the cancel-signal control portion comprises a first searching portion operable to change values of the phase and amplitude of the cancel signal within respective primary phase and amplitude search ranges at respective primary phase and amplitude searching pitches, for the signal-strength detecting portion to detect values of the strength of the received signal at respective primary monitoring points defined by respective sets of the changed values of the phase and amplitude of the cancel signal, to search for primary optimum values of the phase and amplitude, and a second searching portion operable to change values of the phase and amplitude of the cancel signal within respective secondary phase and amplitude search ranges at respective secondary phase and amplitude searching pitches, for the signal-strength detecting portion to detect values of the strength of the received signal at respective secondary monitoring points defined by respective sets of the changed values of the phase and amplitude of the cancel signal, to search for final optimum values of the phase and amplitude, the secondary phase and amplitude search ranges being respectively narrower than the primary phase and amplitude search ranges and respectively including the primary optimum values, and the secondary phase and amplitude searching pitches being respectively smaller than the primary phase and amplitude searching pitches. In this arrangement, the primary optimum values of the phase and amplitude of the cancel signal are initially found by a primary or rough search made within the comparatively wide search ranges by the first searching portion, and the final optimum values are then found by a secondary or fine search made within the comparatively narrow search ranges by the second searching portion. The combination of the primary and secondary searches (rough and fine searches) permits more efficient finding of the final optimum values of the phase and amplitude of the cancel signal, in a shorter length of time with a reduced operating load acting on the cancel-signal control portion.

In a second preferred form of the above-described second preferred form of the second aspect of the invention, wherein the cancel-signal control portion includes a first determining portion operable to determine whether a current set value of at least one of the phase and amplitude of the cancel signal should be changed, on the basis of the strength of the received signal detected by the signal-strength detecting portion. In this form of the invention, the determination as to whether the currently set value of the phase or amplitude should be changed can be made by the first determining portion after normal communication with the radio-frequency communication device with the transponder after the optimum values of the phase and amplitude have been once optimized, so that the currently set value of the phase or amplitude can be updated according to a change of the operating environment of the radio-frequency communication device.

In one advantageous arrangement of the above-described second preferred form of the second aspect of the invention, the first determining portion is arranged to determine that the currently set value of the phase or amplitude of the cancel signal should be changed, when the strength of the received signal detected by the signal-strength detecting portion is larger than a first threshold which is set after optimum values of the phase and amplitude of the cancel signal have been set, and on the basis of a strength of the received signal which corresponds to the optimum values. In this case wherein the first determining portion determines that the currently set value of the phase or amplitude should be changed, when the detected strength is larger than the first threshold, the currently set value can be suitably updated according to a change of the operating environment of the radio-frequency communication device.

Preferably, the cancel-signal control portion further includes a second determining portion operable prior to the determination by the first determining portion, to determine whether the currently set value of the at least one of the phase and amplitude of the cancel signal should be changed. In this arrangement, the determination as to whether the currently set value of the phase or amplitude should be changed can be made by the second determining portion after normal communication with the radio-frequency communication device with the transponder after the phase and amplitude have been once optimized, so that the currently set value of the phase or amplitude can be updated according to a change of the operating environment of the radio-frequency communication device.

The determination made by the second determining portion prior to the determination by the first determining portion is preferably a determination as to whether a re-adjustment of the cancel signal to optimize again the phase and amplitude is required, while the determination by the first determining portion is preferably a determination as to whether a fine adjustment of the cancel signal is required after the second determining portion has determined that the re-adjustment is no more required. In this case, either the re-adjustment or the fine adjustment of the cancel signal is selectively effected according to results of the determinations by the first and second determining portions, depending upon whether the amount of deviation of the currently set values of the phase and amplitude from the optimum values at which the unnecessary wave can be most adequately eliminated. Accordingly, the phase and amplitude of the cancel signal can be optimized with a high degree of efficiency in a shorter length of time, with a reduced operating load acting on the cancel-signal control portion.

Preferably, the second determining portion is arranged to determine that the currently set value of the at least one of the phase and amplitude of the cancel signal should be changed, when the strength of the received signal detected by the signal-strength detecting portion is larger than a second threshold value which is larger than the first threshold value and which is set after the optimum values of the phase and amplitude of the cancel signal have been set by the cancel-signal control portion, and on the basis of a strength of the received signal which corresponds to said optimum values. For example, the second determining portion determines that the currently set values of both of the phase and amplitude of the cancel signal should be changed, if the currently detected strength of the received signal is higher than the second threshold value larger than the first threshold value. Accordingly, the phase and amplitude of the cancel signal can be optimized as needed according to a change of the operating environment of the radio-frequency communication device.

In another advantageous arrangement of the second preferred form of the second aspect of this invention, the cancel-signal control portion further includes a control-signal generating portion operable to supply the cancel-signal generating portion with a control signal for changing at least one of the phase and amplitude of the cancel signal, when the first determining portion has determined that the currently set value of the at least one of the phase and amplitude of the cancel signal should be changed. In this case wherein the control signal is applied to the cancel-signal generating portion when the first determining portion has determined that the currently set value of the phase or amplitude of the cancel signal should be changed, the currently set value of the phase or amplitude can be finely adjusted according to a change of the operating environment of the radio-frequency communication device.

Preferably, the first determining portion determines whether the currently set value of the phase of the cancel signal generated by the cancel-signal generating portion should be changed, on the basis of the strength of the received signal detected by said signal-detecting portion, and the control-signal generating portion supplies the cancel-signal generating portion with the control signal to change the phase when the first determining portion has determined that the phase should be changed. In this case wherein the control signal is applied to the cancel-signal generating portion when the first determining portion has determined that the currently set value of the phase of the cancel signal should be changed, the currently set value of the phase can be finely adjusted according to a change of the operating environment of the radio-frequency communication device.

In a further advantageous arrangement of the above-described second preferred form of the second aspect of the invention, the cancel-signal control portion further includes a third determining portion operable to determine whether currently set values of the phase and amplitude of the cancel signal should be changed again, on the basis of the strength of the received signal detected by the signal-strength detecting portion after the currently set value of at least one of the phase and amplitude of the cancel signal is changed according to the determination by the first determining portion that the currently set value of the at least one of the phase and amplitude should be changed. In this arrangement, the determination as to whether the currently set value of the phase or amplitude should be changed again can be made by the third determining portion after normal communication with the radio-frequency communication device with the transponder after the fine adjustment of at least one of the phase and amplitude to the optimum value according to the determination of the first determining portion that the currently set value of the phase or amplitude should be changed. Accordingly, the currently set value of the phase or amplitude after the fine adjustment can be optimized according to a change of the operating environment of the radio-frequency communication device.

According to a third preferred form of the above-described second aspect of this invention, the cancel-signal control portion further includes a transmission/reception control portion operable to control the carrier transmitting portion to transmit toward the transponder the carrier wave modulated by the carrier modulating portion, immediately after an operation of the cancel-signal control portion for controlling the carrier generating portion, and to control the signal receiving portion to receive a reply signal transmitted from the transponder in response to the modulated carrier wave received from the carrier modulating portion through the carrier transmitting portion. In this form of the invention wherein the modulated carrier wave is transmitted from the carrier modulating portion through the carrier transmitting portion, and the reply signal transmitted from the transponder is received by the signal receiving portion, immediately after the operation of the cancel-signal control portion to control the phase and amplitude of the cancel signal. Accordingly, the communication with the transponder can be effected with a high degree of sensitivity of reception of the reply signal, and a high degree of elimination of the unnecessary wave by the cancel signal the phase and amplitude of which have been optimized by the cancel-signal control portion.

BRIEF DESCRIPTION OF THE DRAWING

The above and other objects, features and industrial significance of this invention will be better understood by reading the following detailed description of preferred embodiments of the invention, when considered in connection with the accompanying drawings in which.

DETAILED DESCRIPTION OF THE PREFERRED EMBODIMENTS

The preferred embodiments of this invention will be described in detail by reference to the accompanying drawings.

Embodiment 1

Figure 1:
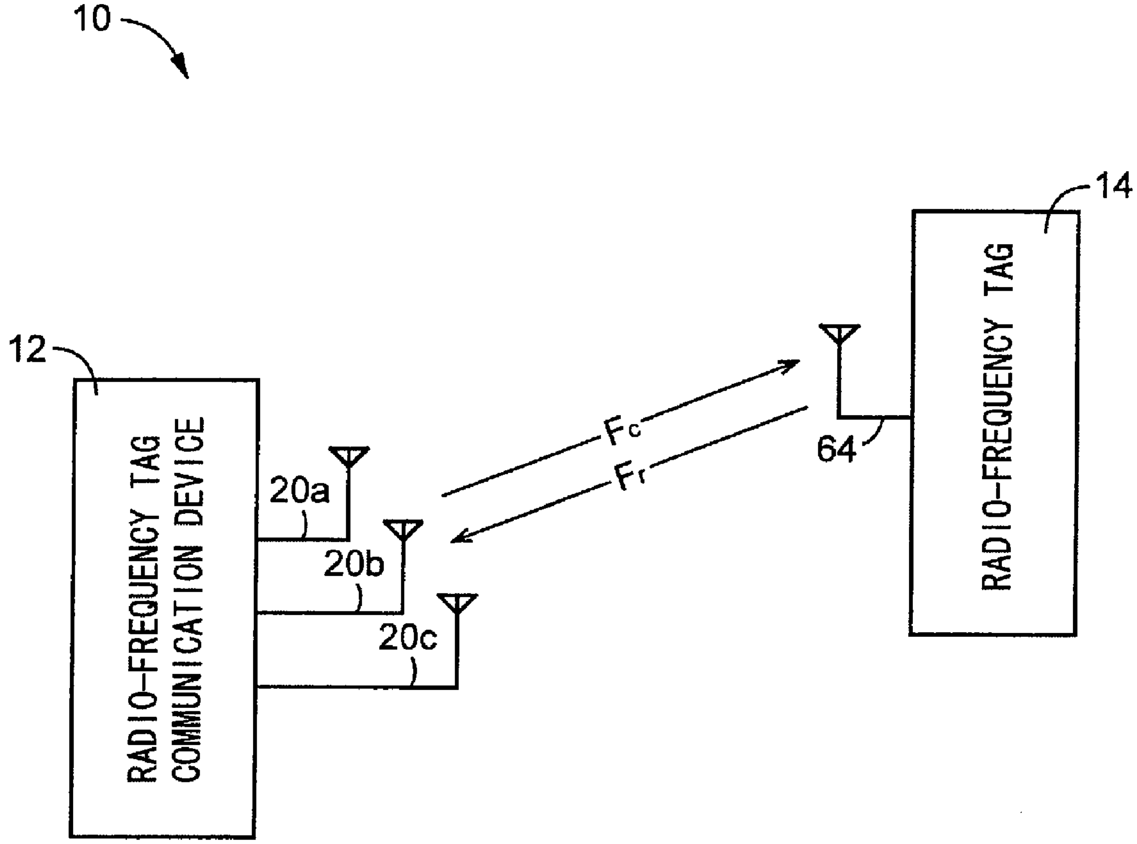
FIG. 1 is a view showing an arrangement of a communication system to which the present invention is applicable.

Referring to FIG. 1, there is shown an arrangement of a radio-frequency communication system 10, which is a so-called RFID (radio-frequency identification) system including a radio-frequency tag communication device 12 constructed according to a first embodiment of this invention, and at least one radio-frequency tag 14. In FIG. 1, only one radio-frequency tag 14 is shown. The radio-frequency tag communication device 12 functions as an interrogator of the RFID system, while the radio-frequency tag 14 functions as a transponder of the RFID system. When a interrogating wave (transmitted signal) $F_c$, is transmitted from the radio-frequency tag communication device 12 toward the radio-frequency tag 14, the interrogating wave $F_c$, received by the radio-frequency tag 14 is modulated into a reply wave $F_r$ (reply signal) according to a predetermined information signal (data) stored in the radio-frequency tag 14, and the reply wave Fr is transmitted from the radio-frequency tag 14 toward the radio-frequency tag communication device 12, in response to the received interrogating wave $F_c$. Thus, radio communication between the radio-frequency tag communication device 12 and the radio-frequency tag 14 is effected.

Figure 2:
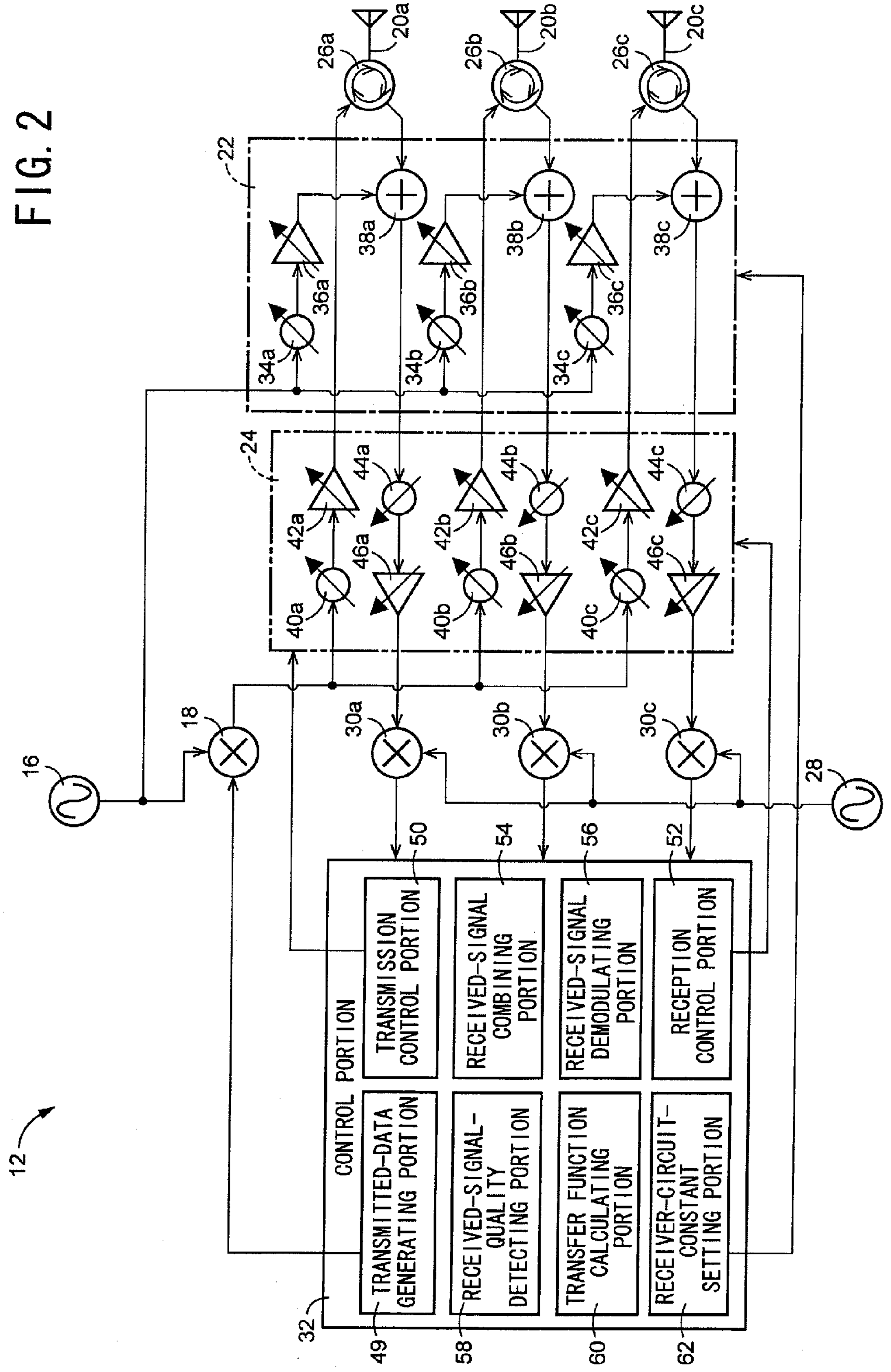
FIG. 2 is a view showing an electrical arrangement of a radio-frequency communication device constructed according to a first embodiment of the present invention, in the form of a radio-frequency tag communication device included in the communication system of FIG. 1.

Referring next to FIG. 2, there is shown an electrical arrangement of the radio-frequency tag communication device 12. As shown in FIG. 2, the radio-frequency tag communication device 12 includes: a carrier generating portion 16 which is operable to generate a carrier wave of the above-indicated transmitted wave having a predetermined frequency and which consists of a PLL (phase locked loop) circuit and a voltage control oscillating circuit that are well known in the art; a transmitted-signal generating portion 18 operable to generate the transmitted signal, by modulating the carrier wave generated by the carrier generating portion 16, according to a transmission information signal (transmitted data) generated by a transmitted-data generating portion 49 (described below); a plurality of transmitter/receiver antenna elements (three antenna elements in the embodiment as shown FIG. 2) 20*a*, 20*b*, 20*c* (hereinafter referred to simply as "transmitter/receiver antenna elements 20", unless otherwise specified) operable to transmit the transmitted signal generated by the transmitted-signal generating portion 18, toward the radio-frequency tag 14, and receive the reply signal transmitted from the radio-frequency tag 14 in response to the transmitted signal; a canceling portion 22 operable to eliminate or cancel leakage signals which are parts of the transmitted signals transmitted from the plurality of transmitter/receiver antenna elements 20, which parts are returned back to the transmitter/receiver antenna elements 20; a directivity control portion 24 operable to control the directions of transmission of the transmitted signals from the respective transmitter/receiver antenna elements 20, and the directions of reception of the received signals by the transmitter/receiver antennas 20; a plurality of transmission/reception separating portions (three separating portions, in the embodiment as shown FIG. 2) 26*a*, 26*b*, 26*c* (hereinafter referred to simply as "transmission/reception separating portions 26", unless otherwise specified) operable to apply the transmitted signals received from the directivity control portion 24, to the transmitter/receiver antenna elements 20, and to apply the received signals received from the transmitter/receiver antenna elements 20, to the directivity control portion 24; a local-signal generating portion 28 operable to generate a local signal having a predetermined frequency; a plurality of down-converters (three converters in the embodiment as shown FIG. 2) 30*a*, 30*b*, 30*c* operable to reduce the frequencies of the received signals, by multiplying the received signals received from the directivity control portion 24, by the local signal generated by the local-signal generating portion 28; and a control portion 320 operable to effect operations of the radio-frequency tag communication device 12, such as an operation to demodulate the down-converted received signals. The transmission/reception separating portions 36 are preferably constituted by circulators or directional couplers.

The canceling portion 22 includes: a plurality of cancel-signal-phase control portions (three control portions in the embodiment as shown in FIG. 2) 34*a*, 34*b*, 34*c* (hereinafter referred to simply as "cancel-signal-phase control portions 34", unless otherwise specified) each operable to control the phase of the carrier wave; a plurality of cancel-signal-amplitude control portions (three control portions in the embodiment as shown in FIG. 2) 36*a*, 36*b*, 36*c* (hereinafter referred to simply as "cancel-signal-amplitude control portions 36", unless otherwise specified) each operable to control the phase of the carrier wave; and a plurality of cancel-signal combining portions (three combining portions in the embodiment as shown in FIG. 2) 38*a*, 38*b*, 38*c* (hereinafter referred to simply as "cancel-signal combining portions 38", unless otherwise specified) each operable to combine together the received signal and the cancel signal. The canceling portion 22 including the cancel-signal-phase control portions 34 and the cancel-signal-amplitude control portions 36 functions as a cancel-signal generating portion operable to generate the cancel signals for eliminating the leakage signals received by the plurality of transmitter/receiver antenna elements 20 due to transmission of the transmitted signals from the plurality of transmitter/receiver antenna elements 20. The cancel signals generated by the plurality of cancel-signal-amplitude control portions 36 are added through the cancel-signal combining portions 38 to the received signals received by the plurality of transmitter/receiver antenna elements 20, so that the leakage signals which are parts of the transmitted signals are offset or canceled by the cancel signals, and are thus eliminated.

The directivity control portion 24 includes a plurality of transmitted-signal-phase control portions (three control portions in the embodiment as shown in FIG. 2) 40*a*, 40*b*, 40*c* (hereinafter referred to simply as "transmitted-signal-phase control portions 40", unless otherwise specified) each operable to control the phase of the transmitted signal received from the transmitted-signal generating portion 18, and a plurality of transmitted-signal-amplitude control portions (three control portions in the embodiment as shown in FIG. 2) 42*a*, 42*b*, 42*c* (hereinafter referred to simply as "transmitted-signal-amplitude control portions 42", unless otherwise specified) each operable to control the amplitude of the transmitted signal. The transmitted-signal-phase control portions 40 and the transmitted-signal-amplitude control portions 42 control the directions of transmission of the transmitted signals to be transmitted from the transmitter/receiver antenna elements 20, by controlling the phases and amplitudes of the transmitted signals. The directivity control portion 24 further includes a plurality of received-signal-phase control portions (three control portions in the embodiment as shown in FIG. 2) 44*a*, 44*b*, 44*c* (hereinafter referred to simply as "received-signal-phase control portions 44", unless otherwise specified) each operable to control the phase of the received signal received from the canceling portion 22, and a plurality of received-signal-amplitude control portions (three control portions in the embodiment as shown in FIG. 2) 46*a*, 46*b*, 46*c* (hereinafter referred to simply as "received-signal-amplitude control portions 46", unless otherwise specified) each operable to control the amplitude of the received signal. The received-signal-phase control portions 44 and the received-signal-amplitude control portions 46 control the directions of reception of the received signals by the transmitter/receiver antenna elements 20, by controlling the phases and amplitudes of the received signals.

The control portion 32 indicated above is a so-called microcomputer which incorporates a CPU, a ROM and a RAM and which operates to implement signal processing operations according to programs stored in the ROM, while utilizing a temporary data storage function of the RAM, to generate the above-described transmitted data, to control the transmission of the transmitted signals toward the radio-frequency tag 14 and the reception of the received signals from the radio-frequency tag 14 in response to the transmitted signals, to control the demodulation of the received signals, to calculate a transfer function indicative of a relationship between the signals which are input to the transmitter/receiver antenna elements 20 and the signals which is generated by the transmitter/receiver antenna elements 20 due to the input signals, to detect the quality of the received signals received by the transmitter/receiver antenna elements 20, and to set a receiver-circuit-constant for improving the quality of the received signals received by the transmitter/receiver antenna elements 20, on the basis of the calculated transfer function. For effecting those various controls, the control portion 32 includes functional portions which are: the above-indicated transmitted-data generating portion 49; a transmission control portion 50; a reception control portion 52; a received-signal combining portion 54; a received-signal demodulating portion 56; a received-signal-quality detecting portion 58; a transfer-function calculating portion 60; and a receiver-circuit-constant setting portion 62.

The transmitted-data generating portion 49 is arranged to generate the transmitted data which is the transmission information signal used to generate the transmitted signal and which is applied to the transmitted-signal generating portion 18. The transmission control portion 50 is arranged to control the phases (and amplitudes, if necessary) of the transmitted signals to be transmitted from the transmitter/receiver antenna elements 20, for thereby controlling the direction of transmission of the transmitted signals. Namely, the transmission control portion 50 controls the directivity control portion 24 for controlling the phase of each transmitted signal, so that a transmitter antenna device consisting of the transmitter/receiver antenna elements 20 functions as a phased array antenna device. Alternatively, the transmission control portion 50 controls the directivity control portion 24 for controlling the phase and amplitude of each transmitted signal, so as to improve the quality of the transmitted signal, so that the transmitter antenna device consisting of the transmitter/receiver antenna elements 20 functions as an adapted array antenna device.

The reception control portion 52 is arranged to control the phases (and the amplitudes, if necessary) of the received signals received by the corresponding transmitter/receiver antenna elements 20, for thereby controlling the directions of reception of the received signals. Namely, the reception control portion 52 controls the directivity control portion 24 for controlling the phase of each received signal, so that a receiver antenna device consisting of the transmitter/receiver antenna elements 20 functions as a phased array antenna device. Alternatively, the reception control portion 52 controls the directivity control portion 24 for controlling the phase and amplitude of each received signal, so that the receiver antenna device consisting of the transmitter/receiver antenna elements 20 functions as an adapted array antenna device. Preferably, the reception control portion 52 is arranged to determine the directions of reception of the received signals so that the sum of the received signals combined by the received-signal combining portion 54 satisfies a predetermined condition (for example, so that the strength (intensity) of the sum is equal to or higher than a predetermined lower limit).

The received-signal combining portion 54 is arranged to combine together the received signals received through the transmitter/receiver antenna elements 20. The directivity of the receiver antenna device consisting of the transmitter/receiver antenna elements 20 is controlled by the directivity control portion 24 which controls the phases and amplitudes of the received signals under the control of the reception control portion 52 before the received signals are combined together by the received-signal combining portion 54.

The received-signal demodulating portion 56 is arranged to demodulate the received signals which have been combined together by the received-signal combining portion 54. Preferably, the received-signal demodulating portion 56 is arranged to first effect AM demodulation of the received signals and then effect FM decoding of the demodulated received signals, for thereby reading the modulated information transmitted from the radio-frequency tag 14.

The received-signal-quality detecting portion 58 is arranged to detect the quality of the received signals received by the transmitter/receiver antenna elements 20. Preferably, the received-signal-quality detecting portion 58 is arranged to detect the strength of the received signals, as the quality of the received signals. That is, the received-signal-quality detecting portion 58 is preferably an RSSI (received-signal strength indicator) circuit.

Figure 3:
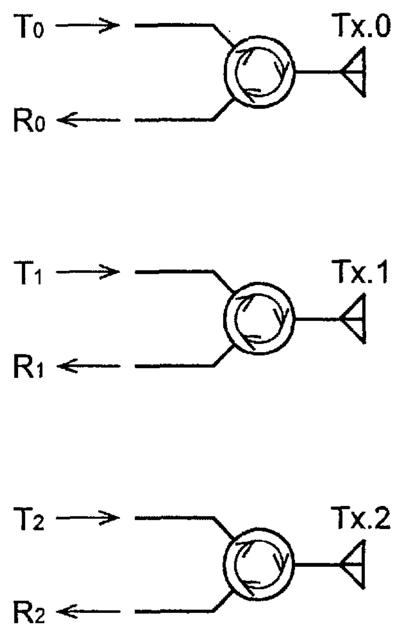
FIG. 3 is a view for explaining a transfer function indicating a relationship between a signal input to a transmitter antenna, and a signal generated by a receiver antenna due to the signal input to the transmitter antenna.

The transfer-function calculating portion 60 is arranged to calculate a transfer function indicative of a relationship between the signal which is input to the transmitter/receiver antenna elements 20 as the transmitter antenna device (due to the transmission of the transmitted signals), and the signal which is generated by the transmitter/receiver antennas 20 as the receiver antenna device due to the signal received by the transmitter antenna device. Referring to FIG. 3, this transfer function will be described. In the present embodiment, the transmitter/receiver antenna elements 20 cooperates with the transmission/reception separating portions 26 to constitute the transmitter antenna device and the receiver antenna device. A transfer function $S_{ji}$ of the carrier wave from a transmitter antenna element i to a receiver antenna element j is represented by the following equation (1a), wherein "$R_j$" represents a signal generated by the receiver antenna element j when a signal $T_i$ is received by the transmitter antenna element. In the present embodiment wherein the transmitter antenna device and the receiver antenna device use the plurality of common transmitter/receiver antenna elements i, a part of the electric wave transmitted from the transmitter/receiver antenna elements i as the transmitter antenna device when the signal $T_i$ is input to the transmitter antenna elements is reflected by surrounding bodies, and is received by the transmitter/receiver antenna elements i. This reflected part of the transmitted electric wave and a wave reflected due to an improper input to the transmitter/receiver antenna elements i are considered to be a leakage signal component $R'_j$ at the transmission/reception separating portions 26. In this sense, the transfer function $S_{ji}$ may be represented by the following equation (1b). The leakage signal component $R'_j$ is entirely an improper interfering signal. Therefore, the transfer function $S_{ji}$ calculated according to the equation (1b) can be considered equivalent to the transfer function $S_{ji}$ calculated according to the equation (1a). The value of the transfer function has linearity, which is constant irrespective of the amplitude and phase of the above-indicated signal $T_i$ input to the transmitter antenna elements i, for example. Accordingly, the signal $R_j$ generated by the receiver antenna elements j when the signal $T_i$ is input to the transmitter antenna elements i is represented by the following equation (2). In the radio-frequency tag communication device provided with an N number of transmitter antenna elements $i_1, i_2, i_3, \ldots i_N$, the signals received by the receiver antenna elements j are a sum of transfers from the transmitter antenna elements i, which is represented by the following equation (3). Namely, when the signal $T_i$ is input to only one of the transmitter antenna elements $i_1, i_2, i_3, \ldots i_N$, the signal $R_j$ generated by the receiver antenna element j is measured. The transfer function $S_{ji}$ of the carrier wave from the transfer antenna element i to the receiver antenna element j can be obtained on the basis of the measured signal $R_j$ and according to the equation (1). In view of the characteristics described above, the transfer-function calculating portion 60 is preferably arranged to calculate the transfer function, by dividing the leakage signal component (transmitted-signal component) included in the received signals received by the transmitter/receiver antenna elements 20, by the transmitted signals transmitted from the transmitter/receiver antenna elements 20. To this end, the transmitter antenna elements i must be sequentially selected, but the signals $R_j$ generated by the receiver antenna elements j can be concurrently measured. Therefore, the transfer functions $S_{ni}$ (n=1, 2, 3, . . . N) of the carrier wave from the transmitter antenna elements I to the plurality of receiver antenna elements j can be concurrently obtained. Preferably, the transfer-function calculating portion 60 calculate the transfer function at a predetermined time interval. It is also preferable that the transfer-function calculating portion 60 calculates the transfer function, depending upon a change of the quality of the received signals detected by the received-signal-quality detecting portion 58. For instance, the transfer-function calculating portion 60 is arranged to calculate the transfer function, when the strength (intensity) of the received signals detected by the received-signal-quality detecting portion 58 is equal to or higher than a predetermined threshold value.

$$Sji = \frac{Rj}{Ti} \tag{1a}$$

$$Sji = \frac{R'j}{Ti} \tag{1b}$$

$$Rj = SjiTi \tag{2}$$

$$Rj = \sum_{i=1}^{N} SjiTi \tag{3}$$

The receiver-circuit-constant setting portion 62 is arranged to set a receiver-circuit constant for improving the quality of the received signals received by the transmitter/receiver antenna elements 20 functioning as the receiver antenna device, on the basis of the transfer function calculated by the transfer-function calculating portion 60, and the signal input to the transmitter/receiver antenna elements 20. Preferably, the receiver-circuit-constant setting portion 62 sets, as the receiver-circuit constant, a constant of the control signal to be applied to the canceling portion 22 for controlling the phases and amplitudes of the cancel signals. The receiver-circuit-constant setting portion 62 sets the receiver-circuit constant each time the direction of transmission of the transmitted signals is changed by the transmission control portion 50. Further, the receiver-circuit-constant setting portion 62 is preferably sets the receiver-circuit constant each time the transfer function is calculated by the transfer-function calculating portion 60.

Figure 4:
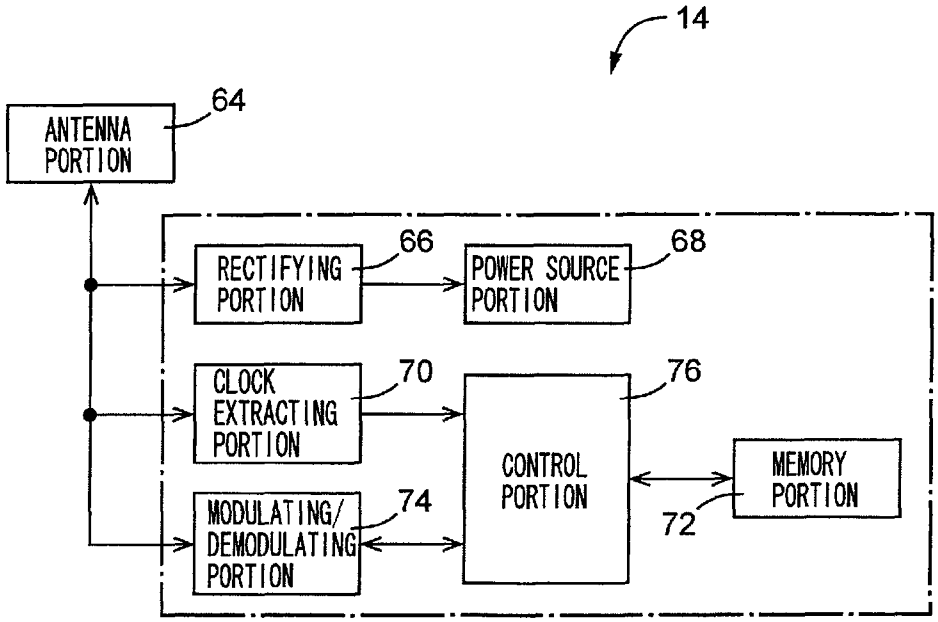
FIG. 4 is a block diagram showing a radio-tag circuit included in a radio-frequency tag which is a communication object with which the radio-frequency tag communication device of FIG. 2 communicates.

Referring to FIG. 4, there is shown an arrangement of a circuit element To of each radio-frequency tag 14. As shown in FIG. 4, the circuit element To includes an antenna portion 64 operable to transmit and receive signals to and from the antenna device consisting of the plurality of transmitter/receiver antenna elements 20 of the radio-frequency tag communication device 12, and an IC circuit portion 65 operable to process the signals received by the antenna portion 64. The IC circuit portion 65 includes: a rectifying portion 66 operable to rectify the carrier wave received by the antenna portion 64; a power source portion 68 operable to store an energy of the carrier wave rectified by the rectifying portion 66; a clock extracting portion 70 operable to extract a clock signal from the carrier wave received by the antenna portion 64, and to apply the extracted clock signal to a control portion 76; a memory portion 72 functioning as an information storage portion operable to store a desired information signal; a modulating/demodulating portion 74 connected to the antenna portion 64 and operable to perform signal modulating and demodulating operations; and the above-indicated control portion 76 operable to control the operations of the circuit element To via the rectifying portion 68, clock extracting portion 70, modulating/demodulating portion 74, etc. The control portion 76 performs basic control operations such as a control operation to store the desired information in the memory portion 72 during communication with the radio-frequency tag communication device 12, and a control operation to control the modulating/demodulating portion 74 to modulate the carrier wave received through the antenna portion 64, according to the information stored in the memory portion 70, and to transmit the modulated carrier wave as the reflected wave through the antenna portion 64. Preferably, the antenna portion 64 is a half-wave dipole antenna consisting of a pair of linear elements.

Figure 5:
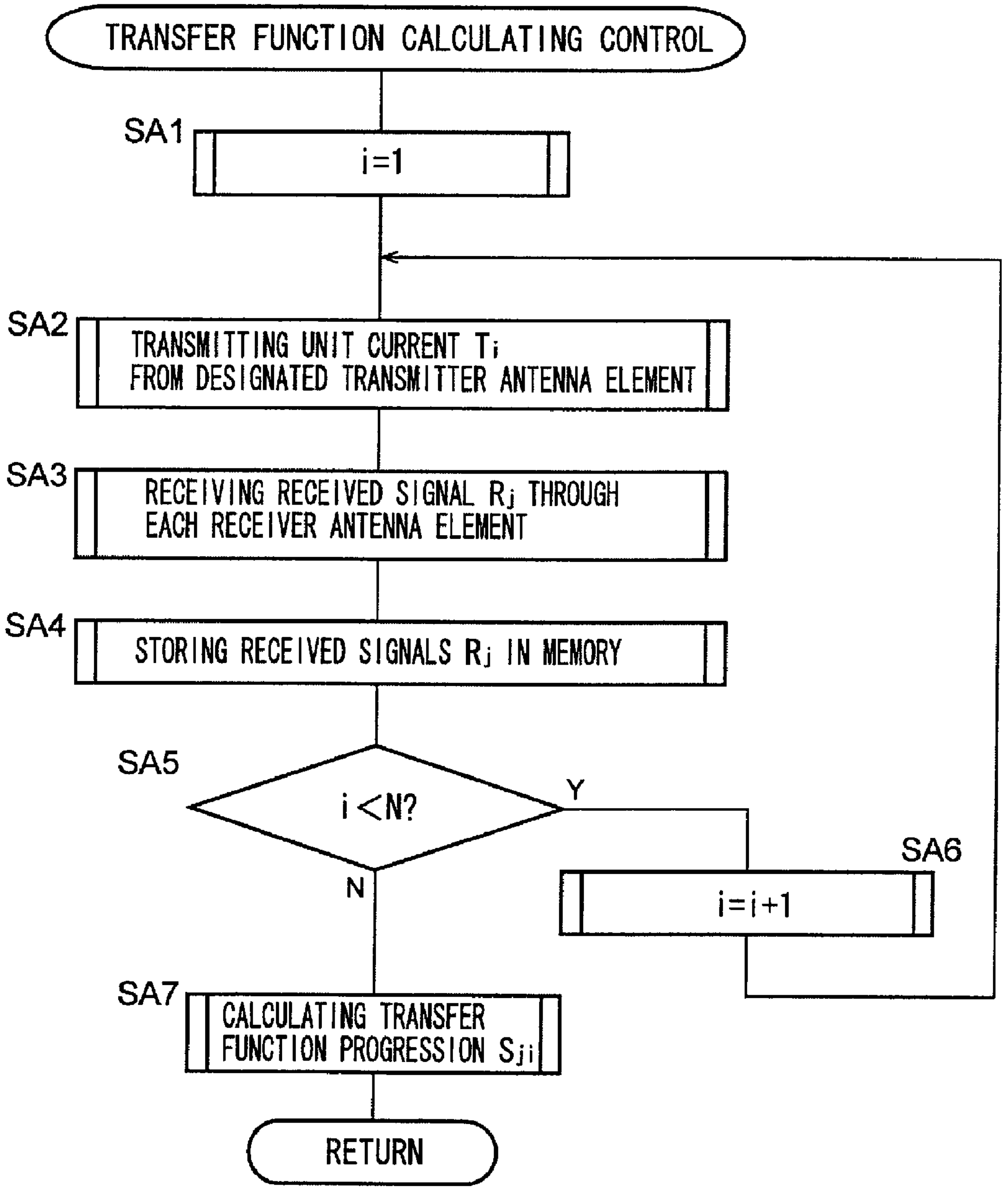
FIG. 5 is a flow chart illustrating a transfer function calculating control performed by a control portion of the radio-frequency tag communication device of FIG. 2.

Referring to the flow chart of FIG. 5, there is illustrated a transfer-function calculating control routine-executed by the control portion 32 of the radio-frequency tag communication device 12. This control routine is repeatedly executed with a predetermined cycle time.

The control routine of FIG. 5 is initiated with step SA1 to set a variable "i" to 1. The variable "i" designates one of the transmitter/receiver antenna elements 20 as a transmitter antenna element i. Then, the control flow goes to step SA2 in which a signal corresponding to a unit current Ti is transmitted from the designated transmitter antenna element i. The control flow then goes to step SA3 wherein each of the transmitter/receiver antenna elements 20 as a receiver antenna element receives the transmitted signal $R_j$. Step SA4 is then implemented to store in the RAM of the control portion 32 the received signals $R_j$ received in step SA3. Then, the control flow goes to step SA5 to determine whether the variable "i" is smaller than the total number N of the transmitter/receiver antenna elements 20 as the transmitter antenna elements. If an affirmative decision is obtained in step SA5, the control flow goes to step SA6 to increment the variable "i" by one, and goes back to step SA2. If a negative determination is obtained in step SA5, the control flow goes to step SA7 to calculate the transfer function progression $S_{ji}$.

Figure 6:
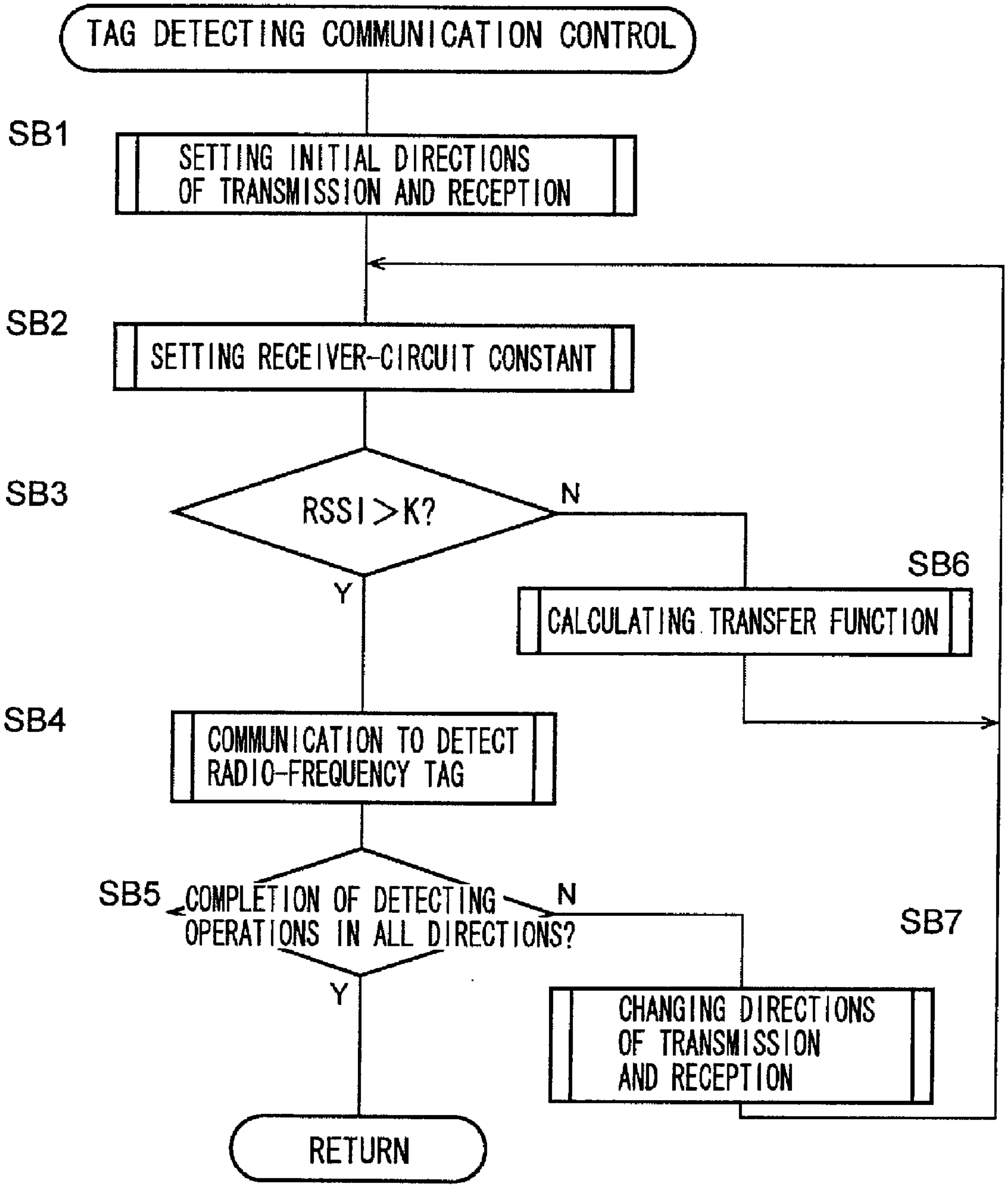
FIG. 6 is a flow chart illustrating a tag detecting communication control routine performed by the control portion of the radio-frequency tag communication device of FIG. 2.

Referring next to the flow chart of FIG. 6, there is illustrated a tag detecting communication control routine executed by the control portion 32 of the radio-frequency tag communication device 12. This control routine is repeatedly executed with a predetermined cycle time.

The control routine of FIG. 6 is initiated with step SB1 to control the directivity control portion 24 to set the initial direction of transmission of the transmitted signals and the direction of reception of the received signals. The control flow then goes to step SB2 corresponding to the receiver-circuit-constant setting portion 62, to set the receiver-circuit constant for improving the quality of the received signals received by the transmitter antenna device in the form of the transmitter/receiver antenna elements 20. Step SB3 is then implemented to determine whether a strength (intensity) RSSI of the received signals received by the receiver antenna device in the form of the transmitter/receiver antenna elements 20 is higher than a predetermined threshold value K. If a negative determination is obtained in step SB3, the control flow goes to step SB6 corresponding to the transfer-function calculating portion 60, to calculate, according to the control routine of FIG. 5, the transfer function indicative of the relationship between the signal input to the transmitter antenna device in the form of the transmitter/receiver antenna elements 20, and the signal generated by the receiver antenna device in the form of the transmitter/receiver antenna elements 20 due to the input signal of the transmitter antenna device. Step SA7 is followed by step SB2. If an affirmative determination is obtained in step SB3, the control flow goes to step SB4 to transmit the transmitted signals from the transmitter/receiver antenna elements 20 toward the radio-frequency tag 14, and to receive through the transmitter/receiver antenna elements 20 the reply signals transmitted from the radio-frequency tag 14, whereby radio communication to detect the radio-frequency tag 14 is implemented. Then, the control flow goes to step SB5 to determine whether the tag detecting operations in all directions are completed. If a negative determination is obtained in step SB5, the control flow goes to step SB7 to control the directivity control portion 24 for changing the direction of transmission of the transmitted signals and the direction of reception of the received signals, and goes back to step SB2. If an affirmative determination is obtained in SB5, the present control routine is terminated. It will be understood that steps SB1, SB5 and SB7 correspond to the transmission control portion 50 and the reception control portion 52.

In the present embodiment of the invention described above, the radio-frequency tag communication device 12 comprises the transfer-function calculating portion 60 (steps SA1-SA7: SB6) operable to calculate the transfer function indicative of the relationship between the signal input to the transmitter antenna device in the form of the transmitter/receiver antenna elements 20 and the signal generated by the receiver antenna device in the form of the transmitter/receiver antenna elements 20 due to the signal input to the transmitter antenna device, and the receiver-circuit-constant setting portion 62 (step SB2) operable to set the receiver-circuit constant for improving the quality of the reply signal received by the receiver antenna device, on the basis of the transfer function calculated by the transfer-function calculating portion 60, and the signal input to the transmitter antenna device. Accordingly, by obtaining the transfer function before radio communication with the communication object, the receiver-circuit constant can be set while taking account of the leakage signal that is a part of the transmitted signal, which part is received by the receiver antenna, Thus, the present radio-frequency tag communication device 12 is capable of effectively eliminating an influence of the transmitted signal on the reception of the reply signal according to a change of the operation to transmit the transmitted signal.

Further, the radio-frequency tag communication device 12 further comprises the cancel-signal generating portion in the form of the canceling portion 22 operable to generate the cancel signal for eliminating the leakage signal which is generated by the receiver antenna device in the form of the transmitter/receiver antenna elements 20 due to transmission of the transmitted signal from the transmitter antenna device in the form of the transmitter/receiver antenna elements 20. The receiver-circuit-constant setting portion 62 sets, as the received-circuit constant, a constant for determining the phase and the amplitude of the cancel signal. This arrangement makes it possible to effectively eliminate the leakage signal that is a part of the transmitted signal transmitted from the transmitter antenna device, which part is mixed in the reply signal received by the receiver antenna device.

Further, the radio-frequency tag communication device 12 further comprises the carrier generating portion 16 operable to generate the carrier wave of the transmitted signal, and the canceling portion 22 generates the cancel signal on the basis of the carrier wave generated by the carrier generating portion 16. Accordingly, the frequency of the carrier wave of the transmitted signal can be made equal to that of the cancel signal, so that the leakage signal mixed in the reply signal received by the receiver antenna device in the form of the transmitter/receiver antenna elements 20 can be more effectively eliminated.

Further, the transmitter antenna device consists of the plurality of transmitter/receiver antenna elements 20. In the radio-frequency tag communication device 12 provided with the transmitter antenna device consisting of the plurality of transmitter/receiver antenna elements 20, the receiver-circuit constant can be easily set, and the area of communication can be enlarged.

Further, the receiver antenna device consists of the plurality of transmitter/receiver antenna elements 20. In the radio-frequency tag communication device 12 provided with the receiver antenna device consisting of the plurality of transmitter/receiver antenna elements 20, the receiver-circuit constant can be easily set, and the area of communication can be enlarged.

Further, the transmitter antenna device and the transmitter antenna device include at least one common transmitter/receiver antenna element 20. Accordingly, the required size of the radio-frequency tag communication device 12 can be minimized.

Further, the radio-frequency tag communication device 12 further comprises the transmission control portion 50 (steps SB1, SB55 and SB7) operable to control the phase of each of the transmitted signals to be transmitted from the plurality of transmitter/receiver antenna elements 20, for thereby controlling the direction of transmission of the transmitted signals. Accordingly, the direction of transmission of the transmitted signals can be suitably controlled.

Further, the receiver-circuit-constant setting portion 62 sets the receiver-circuit constant each time the direction of transmission of the transmitted signals is changed by the transmission control portion 50. In the radio-frequency tag communication device 12 provided with the transmitter antenna device in the form of a phased-array antenna device, the receiver-circuit constant can be set as needed.

Further, the transfer-function calculating portion 60 calculates, as the transfer function, a value obtained by dividing the transmitted-signal component included in the received signals received by the transmitter/receiver antenna elements 20, by the predetermined transmitted signals to be transmitted from the transmitter/receiver antenna elements 20. Accordingly, the leakage signal that is a part of the transmitted signals which part is included in the received signals received by the transmitter/receiver antenna elements 20 can be effectively estimated.

Further, the transfer-function calculating portion 60 calculates the transfer function at a predetermined time interval. Accordingly, the receiver-circuit constant can be updated on the basis of the transfer function calculated as needed.

Further, the radio-frequency tag communication device 12 further comprises the received-signal-quality detecting portion 58 operable to detect the quality of the received signals received by the transmitter/receiver antenna elements 20, and the transfer-function calculating portion 60 calculates the transfer function, depending upon the quality of the received signals detected by the received-signal-quality detecting portion 58. Accordingly, the transfer function can be calculated as needed.

Further, the received-signal-quality detecting portion 58 detects, as the quality of the received signals, a strength of the received signals while the reply signal transmitted from the communication object is not received by the transmitter/receiver antenna elements 20, and the transfer-function calculating portion 60 calculates the transfer function when the strength of the received signal detected by the received-signal-quality detecting portion 58 is equal to or higher than the predetermined threshold. Accordingly, the transfer function can be updated when the strength of the leakage signal included in the received signals is estimated to be comparatively high.

Further, the receiver-circuit-constant setting portion 62 sets the receiver-circuit constant each time the transfer-function calculating portion 60 calculates the transfer function. Accordingly, the received-circuit constant can be set on the basis of the transfer function calculated last by the transfer-function calculating portion 60.

Further, the communication object is the radio-frequency tag 14 operable to transmit the reply signal including predetermined information, in response to the transmitted signal transmitted from the transmitter/receiver antenna elements 20. In the radio-frequency tag communication device 12 operable to communicate with the radio-frequency tag 14, the influence of the transmitted signal on the reception of the received signal can be effectively eliminated according to a change of the direction of transmission of the transmitted signal.

Referring to FIGS. 7-19, there will be described other embodiments of this invention. In the following embodiments, the same reference signs as used in the first embodiment will be used to identify the corresponding elements, which will not be described redundantly.

Embodiment 2

Figure 7:
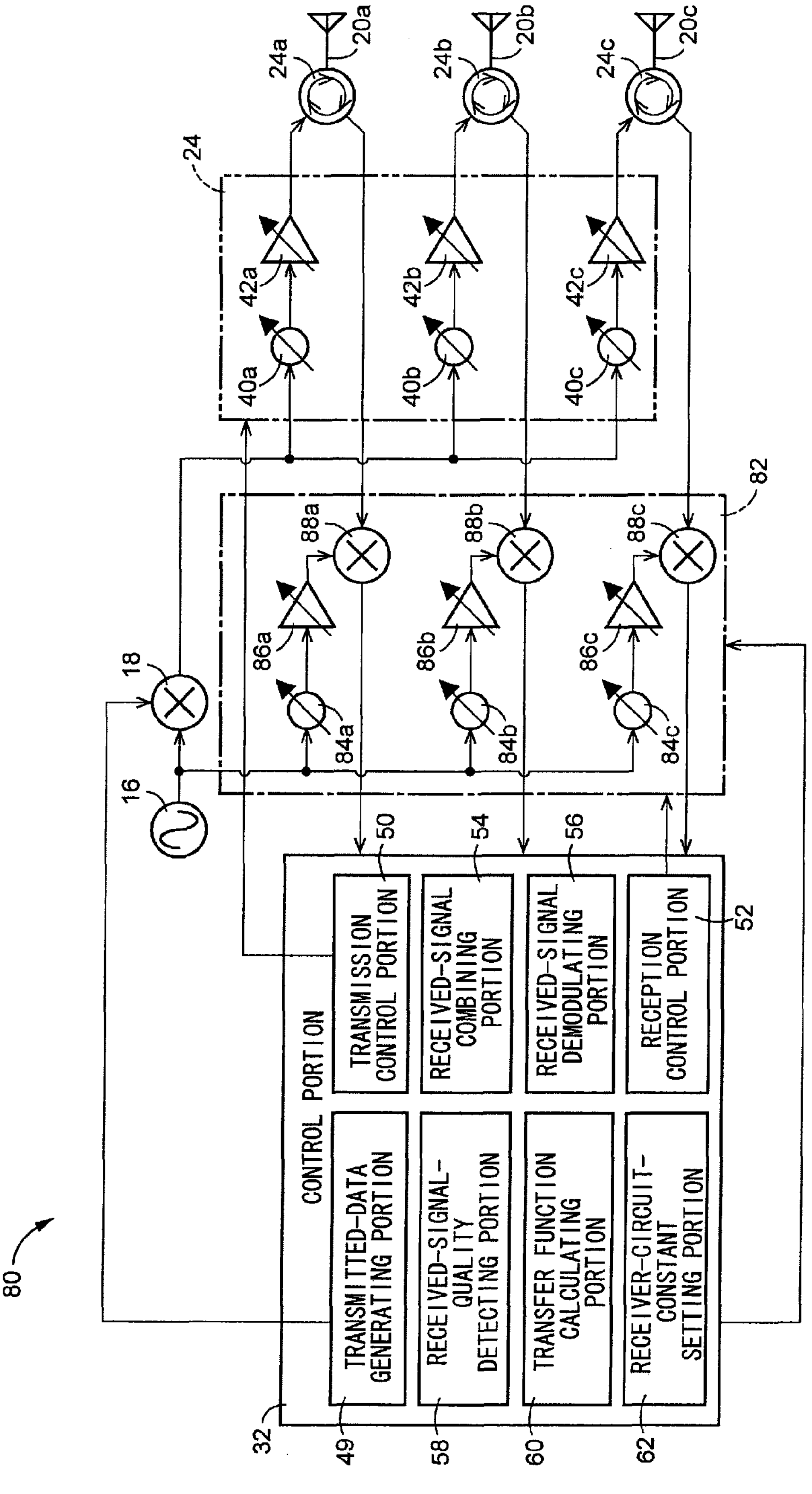
FIG. 7 is a view showing an electrical arrangement of a radio-frequency communication device constructed according to a second embodiment of this invention, in the form of a radio-frequency tag communication device included in the communication system of FIG. 1.

Referring to FIG. 7, there will be described an electrical arrangement of a radio-frequency tag communication device 80 constructed according to a second embodiment of the present invention. As shown in FIG. 7, the radio-frequency tag communication device 80 according to the second embodiment includes a wave detecting portion 82 functioning as a local-signal oscillator operable to generate local signals on the basis of the carrier waves received from the carrier generating portion 16, and to combine together the generated local signals and the received signals received by the plurality of transmitter/receiver antenna elements 20. This wave detecting portion 82 includes: a plurality of local-signal-phase control portions (three control portions in the embodiment as shown in FIG. 7) 84*a*, 84*b*, 84*c* (hereinafter referred to simply as "local-signal-phase control portions 84", unless otherwise specified) operable to control the phases of the carrier waves received from the carrier generating portion 16; a plurality of local-signal-amplitude control portions (three control portions in the embodiment as shown in FIG. 7) 86*a*, 86*b*, 86*c* (hereinafter referred to simply as "local-signal-amplitude control portions 86", unless otherwise specified) operable to control the amplitudes of the carrier waves the phases of which have been controlled by the local-signal-phase control portions 84; and a plurality of local-signal combining portions (three combining portions) 88*a*, 88*b*, 88*c* (hereinafter referred to simply as "local-signal combining portions 88", unless otherwise specified) operable to combine together the local signals generated by the local-signal-amplitude control portions 86, and the received signals received by the plurality of transmitter/receiver antenna elements 20. That is, the wave detecting portion 82 is a homodyne wave detecting circuit operable to effect homodyne wave detection on the basis of the main carrier waves the phases of which have been controlled. The received-circuit-constant setting portion 62 is arranged to calculate, as the received-circuit constant, a constant used to control the local signals generated by the wave detecting portion 82.

The homodyne wave detecting circuit such as the wave detecting portion 82 described above provides an output signal $F_j$ represented by the following equation (6), by multiplying the received signal R represented by the following equation (4), by the local signal L represented by the following equation (5). The output signal $F_j$ does not include a component ω included in the equations (4) and (5). The component is an angular frequency of the carrier wave. In the equations (4)-(6), A and B are values relating to the amplitude, while $\theta_j$ and $\psi_j$ are values relating to the phase. To maximize the level of the output signal $F_j$ of the wave detecting portion 82, a value of $\cos(\theta_j-\psi_j)$ must be a maximum value of 1, that is, the phase of the local signal $L_j$ must be controlled so as to satisfy a relationship of $\theta_j=\psi_j$. When a weight given to the transmitter antenna device in the form of the transmitter/receiver antenna elements 20 is changed by controlling the directivity control portion 24, the level of the leakage signal that is a part of the transmitted signal which part is received by the receiver antenna device in the form of the transmitter/receiver antenna elements 20 is accordingly changed. An influence of this change of the level of the leakage signal can be reduced by controlling the phases and amplitudes with the local-signal-phase control portions 84 and the local-signal-amplitude control portions 86. Further, the level of the leakage signal received by the transmitter/receiver antenna elements 20 functioning as the receiver antenna device is changed by movements of reflecting bodies located around the radio-frequency tag communication device 80. However, an influence of this change of the level of the leakage signal can be eliminated by the receiver-circuit-constant setting portion 62.

$$Rj = Aj\sin(\omega t + \theta j) \tag{4}$$

$$Lj = Bj\sin(\omega t + \psi j) \tag{5}$$

$$Fj = \frac{AjBj}{2}\cos(\theta j - \psi j) \tag{6}$$

The radio-frequency tag communication device 80 according to the second embodiment described above is provided with the wave detecting portion 82 operable to generate the local signals, and to combine the local signals and the received signals received by the plurality of transmitter/receiver antenna elements 20. In this second embodiment, the received-circuit-constant setting portion 62 is arranged to set, as the received-circuit constant, the constant used to control the local signals. Accordingly, the leakage signals that are parts of the transmitted signals which parts are included in the transmitter antenna device in the form of the transmitter/receiver antenna elements 20 can be effectively eliminated.

Further, the wave detecting portion 82 is arranged to generate the local signals on the basis of the carrier waves received from the carrier generating portion 16. Accordingly, the frequency of the local signals can be made equal to the frequency of the carrier wave of the transmitted signals, so that the leakage signals included in the received signals received by the transmitter/receiver antenna elements 20 functioning as the receiver antenna device can be effectively eliminated.

While the preferred embodiments of this invention have been described above by reference to the drawings, it is to be understood that the invention is not limited to these embodiments, but may be otherwise embodied.

In the above-described embodiments, the transmitted-data generating portion 49, transmission control portion 50, reception control portion 52, received-signal combining portion 54, received-signal demodulating portion 56, received-signal-quality detecting portion 58, transfer-function calculating portion 60 and received-circuit-constant setting portion 62 are functional portions of the control portion 32. However, those portions 49-62 may be separate control devices. Further, the portions 49-62 may be arranged to achieve their control functions by either digital signal processing or analog signal processing.

The radio-frequency tag communication devices 12, 80 according to the above-described first and second embodiments include the plurality of transmitter/receiver antenna elements 20 arranged to transmit the transmitted signals toward the radio-frequency tag 14, and to receive the reply signals transmitted from the radio-frequency tag 14 in response to the transmitted signals. However, the radio-frequency tag communication devices 12, 80 may include a plurality of transmitter antenna elements arranged to transmit the transmitted signals, and a plurality of receiver antenna elements arranged to receive the reply signals. Further, the transmitter antenna device and the receiver antenna device may include at least one common transmitter/receiver antenna element. In this case, the required size of the radio-frequency tag communication devices 12, 80 can be reduced.

In the preceding embodiments, the transmission control portion 40 is arranged to control the phase and amplitude of each of the transmitted signals transmitted from the plurality of transmitter/receiver antenna elements 20, for thereby controlling the direction of transmission of the transmitted signals. However, the transmission control portion 40 may be arranged to control only the phase of each transmitted signal. Similarly, the reception control portion 42 may be arranged to control only the phase of each of the received signals, for thereby controlling the direction of reception of the received signals.

In the preceding embodiments, the received-signal-quality detecting portion 58 may be arranged to detect the quality of each received signal while the reply signal is received from the radio-frequency tag 14. The received-circuit-constant setting portion 62 may be arranged to set or adjust the received-circuit constant, on the basis of the detected quality of the received signal, while the reply signal is received from the radio-frequency tag 14.

Embodiment 3

Figure 8:
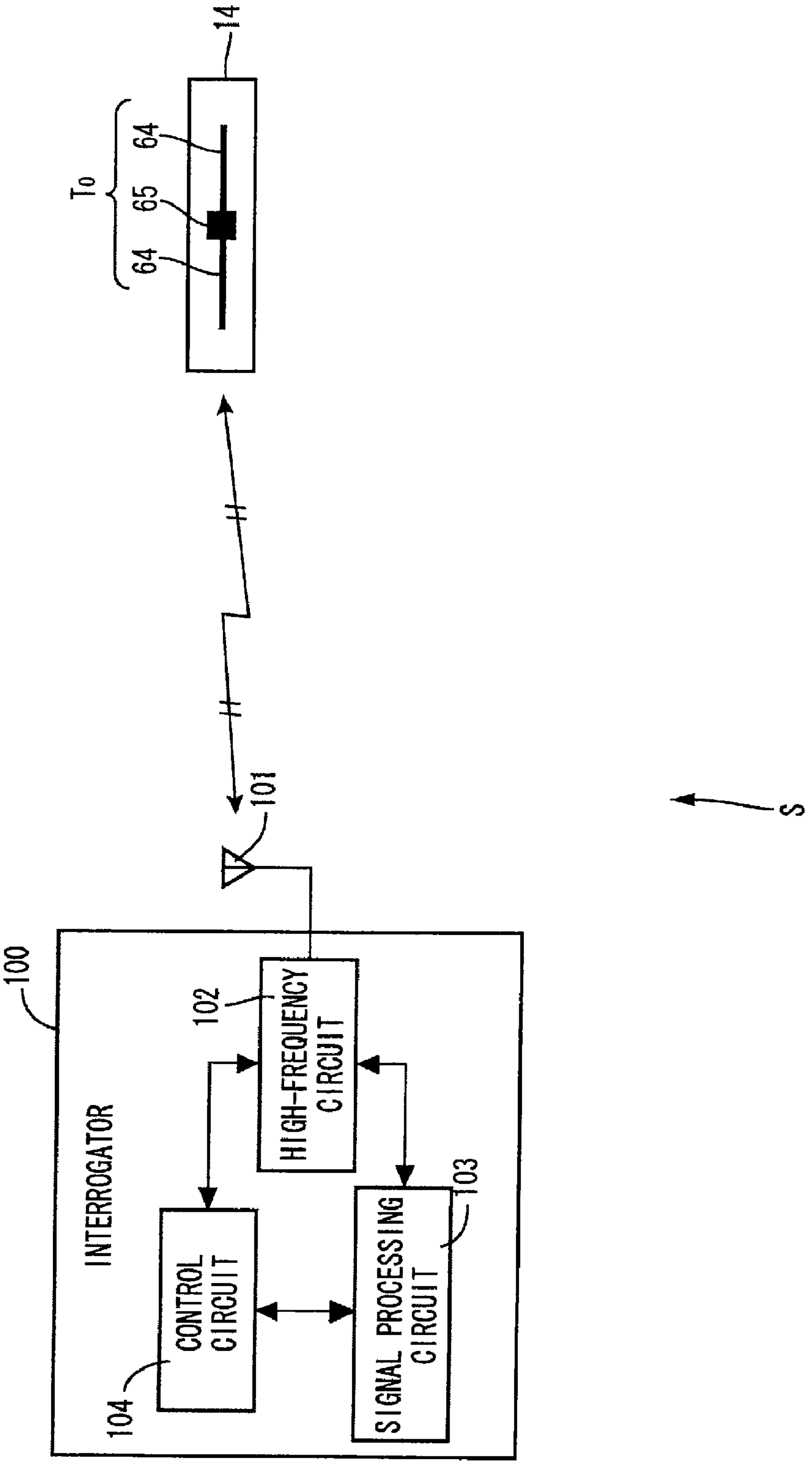
FIG. 8 is a schematic view showing a radio-frequency communication system including an interrogator constructed according to a third embodiment of this invention.

Referring next to FIG. 8, there will be described an overall arrangement of a radio-frequency tag communication system S including a radio-frequency communication device in the form of an interrogator 100 constructed according to a third embodiment of this invention, and a transponder in the form of the radio-frequency tag 14 described above.

The interrogator 100 includes: an antenna 101 for radio communication between a circuit element To of the radio-frequency tag 14 and the antenna 101; a high-frequency circuit 102 operable to obtain access to (to read and write information on or from) an IC circuit portion 65 of the circuit element To; a signal-processing circuit 103 operable to process signals read out from the circuit element To; a control circuit 104 operable to control the operation of the interrogator 100.

The control circuit 104 is a so-called microcomputer incorporating a central processing unit (CPU), a ROM and a RAM, which are not shown in FIG. 8. The CPU operates to perform signal processing operations according to control programs stored in the ROM, while utilizing a temporary data storage function of the RAM.

Figure 9:
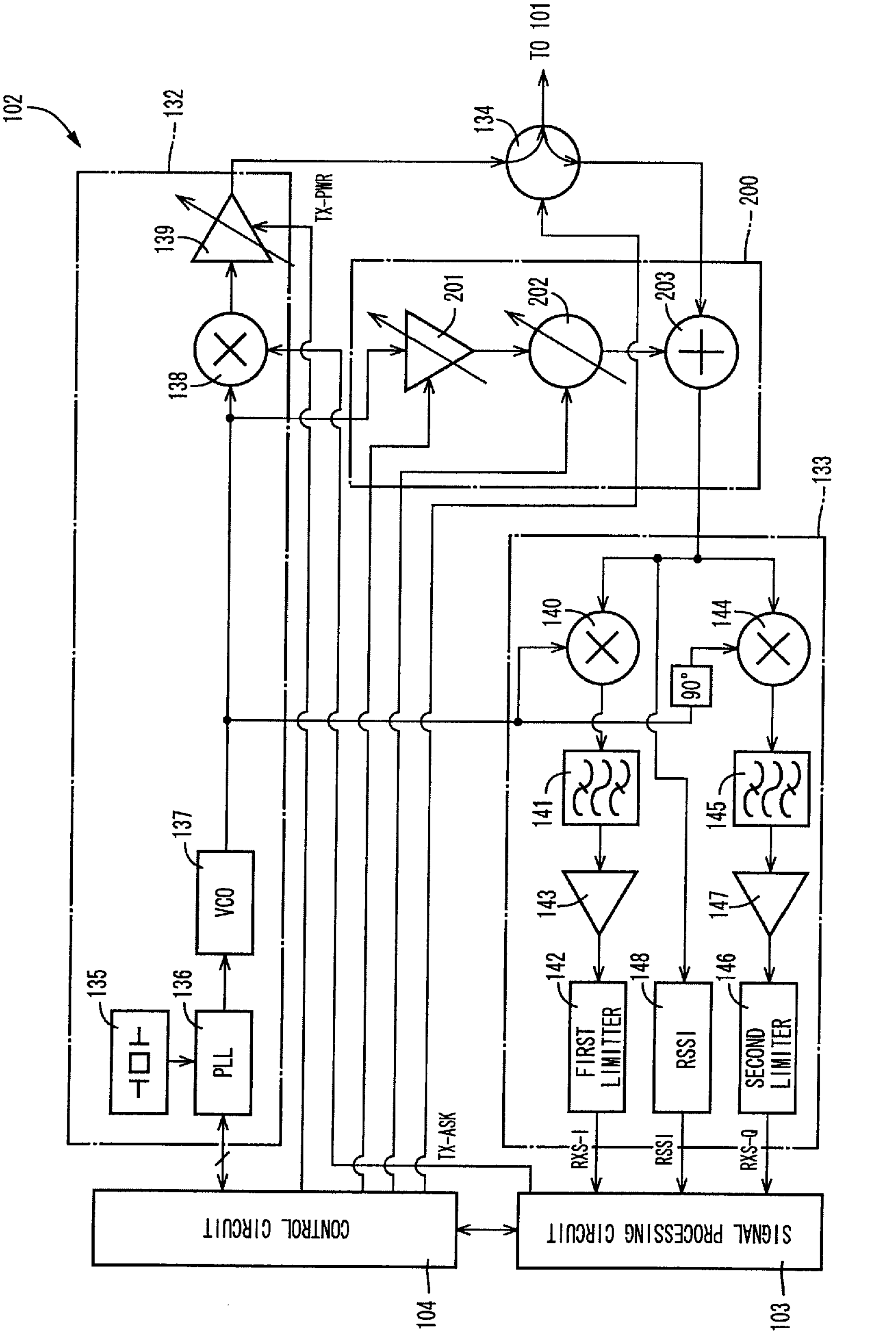
FIG. 9 is a functional block diagram showing functional elements of a high-frequency circuit included in the interrogator of FIG. 8.

The functional block diagram of FIG. 9 shows an arrangement of functional elements of the high-frequency circuit 102 of the interrogator 100.

As shown in FIG. 9, the high-frequency circuit 102 includes: a transmitter portion 132 (functioning as a carrier generating portion) operable to transmit a signal through the antenna 101 toward the circuit element To; a receiver portion 133 operable to receive through the antenna 102 a reflected wave transmitted from the circuit element To; a transmission/reception separator 134 (constituted by a circulator, for example) operable to transmit the signal form the transmitter portion 132 to the antenna 101, and to transmit the signal through the antenna 102, to the receiver portion 133; and a canceling circuit 200 (functioning as a cancel-signal generating portion) operable to generate a cancel signal (offset signal) for eliminating an unnecessary wave (leakage signal) that is a part of the transmitted signal transmitted from the transmitter portion 132, which part is included in the received signal received by the receiver portion 133.

The canceling circuit 200 includes a cancel-signal-amplitude control portion 201 and a cancel-signal-phase control portion 202 which are respectively operable to control an amplitude and a phase of the carrier wave received from the transmitter portion 132, for thereby generating the cancel signal. The canceling circuit 200 further includes a multiplexer 203 operable to combine together the cancel signal generated by the cancel-signal-amplitude control portion 201 and the cancel-signal-phase control portion 202, and the received signal received by the antenna 101.

The transmitter portion 132 includes: a carrier generating portion in the form of a quartz oscillator 135 operable to generate the carrier wave for obtaining access to the IC circuit portion 65 of the circuit element To (for reading and writing information from or on the IC circuit portion 65); a PLL (phase locked loop) 136; a VCO (voltage controlled oscillator) 137; a transmitter-side multiplying circuit 138 (carrier-wave modulating portion, which may be an amplification-factor-variable amplifier for amplitude modulation of the carrier wave) operable to modulate the carrier wave generated on the basis of a signal received from the control circuit 104 (e.g., to effect amplitude modulation of the carrier wave on the basis of a signal TX_ASK received from the control circuit 104); and a variable transmitter amplifier 139 operable to amplify the carrier wave modulated by the transmitter-side multiplying circuit 138, according to an amplification factor determined according to a signal TX_PWR received from the control circuit 104. The carrier wave is preferably around 950 MHz, or around 2.45 GHz. The modulated wave generated by the transmitter-side multiplying circuit 138 and amplified by the variable transmitter amplifier 139 is transmitted through the transmission/reception separator 134 and the antenna 101, to the IC circuit portion 65 of the circuit element To of the radio-frequency tag 14.

The receiver portion 133 includes: a first receiver-side multiplying circuit 140 operable to effect homodyne detection by multiplying a composite signal of the received signal received by the antenna 101 and the cancel signal, which composite signal has been obtained by the multiplexer 203, by the carrier wave generated by the transmitter portion 132; a first band pass filter 142 operable to extract a necessary frequency-band signal from an output of the first receiver-side multiplying circuit 140; a first receiver-side amplifier 143 operable to amplify an output of the first band pass filter 142 and apply the amplified output to a first limiter 142; a second receiver-side multiplying circuit 144 operable to effect homodyne detection by multiplying the above-indicated composite signal of the received signal and the cancel signal, by the carrier wave the phase of which has been retarded by 90° after the generation by the transmitter portion 132; a second receiver-side amplifier 147 operable to amplify an output of the second band pass filter 145 and apply the amplified output to a second limiter 146. A signal RXS-I generated by the first limiter 142 and a signal RXS-Q are processed by the above-described signal processing circuit 103.

The composite signal obtained by the multiplexer 203 by combining together the received signal received by the antenna 101 and the cancel signal is applied also to an RSSI circuit (received-signal strength indicator) 148, and a signal RSSI indicative of the strength or intensity of the composite signal detected by the RSSI circuit 148 is applied to the signal processing circuit 103. In the interrogator 100 constructed as described above, the reflected wave received from the circuit element To of the radio-frequency tag 14 is demodulated by I-Q demodulation.

The signal processing circuit 103 is arranged to perform a predetermined arithmetic operation regarding the received signal received from the receiver portion 133, and the other signals, and to apply a modulation control signal to the transmitter-side multiplying circuit 138, according to a result of the arithmetic operation.

The control circuit 104 is arranged to apply an amplitude control signal and a phase-control signal to the cancel-signal-amplitude control portion 201 and the cancel-signal-phase control portion 202 of the canceling circuit 200, respectively, according results of the arithmetic operations on the basis of the RSSI signal received from the RSSI circuit 148 (on the basis of the output signal of the multiplexer 203). For example, the control circuit 104 is connected to a communication line via an input/output interface (not shown), and is arranged to communicate with a route server, any other terminal, general-purpose computer and information server, which are connected to the communication line.

A dominant feature of the present third embodiment is that the transmitter portion 132 transmits the carrier wave through the antenna 101 before the radio communication of the interrogator 100 with the circuit element To of the radio-frequency tag 14, that is, while no reflected wave from the circuit element To is received by the interrogator 100. According to the signal received from the signal processing circuit 103 which has received the above-described RSSI signal, the control circuit 104 controls the amplitude control signal and the phase control signal to be applied to the cancel-signal-amplitude control portion 201 and the cancel-signal-phase control portion 202, for adjusting the phase and amplitude of the cancel signal to optimum values suitable for canceling or eliminating the unnecessary wave or leakage signal. This aspect of the third embodiment will be described in detail.

To cancel or eliminate the unnecessary wave which is a part of the transmitted signal transmitted by the transmitter portion 132 through the antenna 101, which part is received by the receiver portion 133 through the antenna 101, the cancel signal generated by the canceling circuit 200 should have the same phase P as the phase of the unnecessary wave, and the amplitude A opposite to the amplitude of the unnecessary wave.

Figure 10:
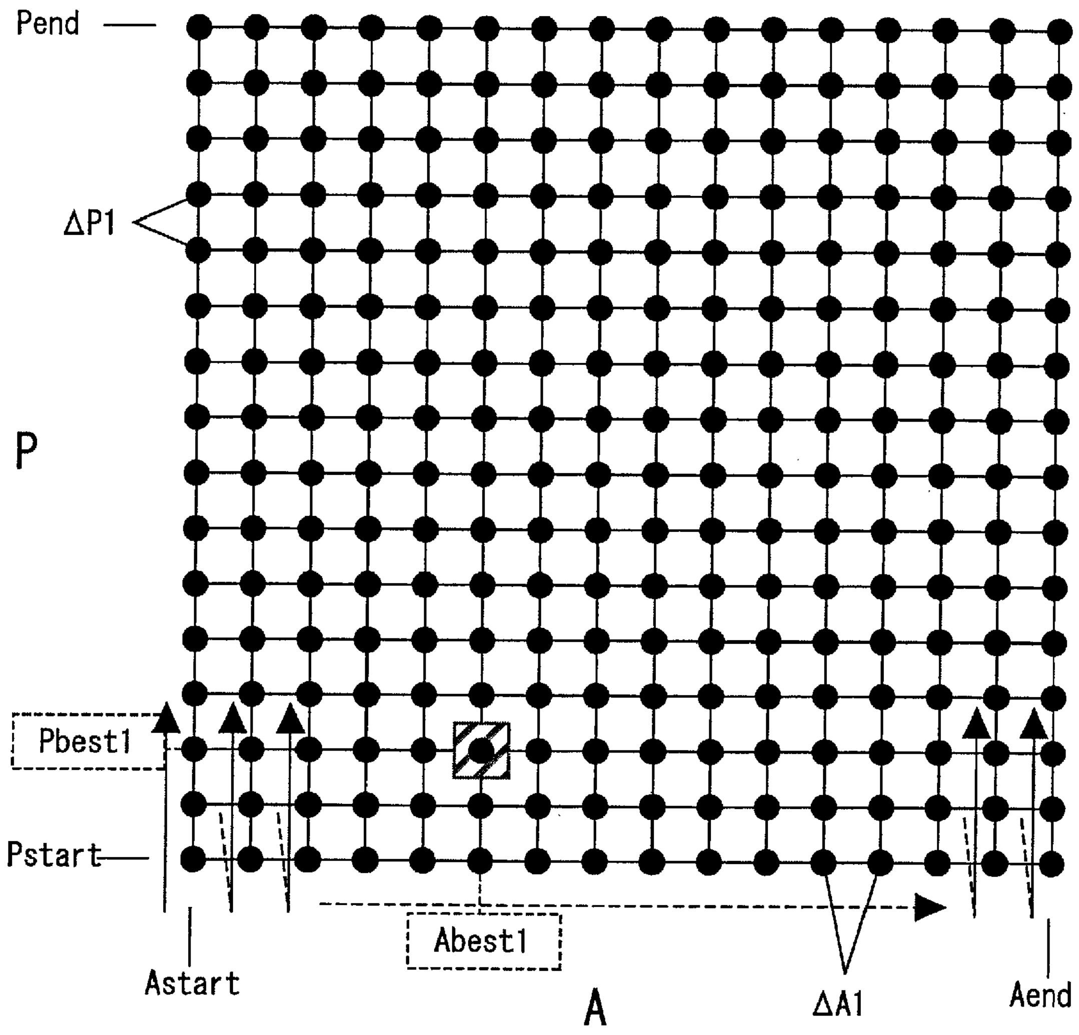
FIG. 10 is a schematic view for explaining a rough search for optimum amplitude and phase of a cancel signal according to the present invention.

FIG. 10 schematically shows a method of setting optimum amplitude A and phase P of the cancel signal according to the third embodiment of this invention, in a coordinate system wherein the amplitude A is taken along the horizontal axis while the phase P is taken along the vertical axis. The optimum values of the amplitude A and phase P of the cancel signal for canceling the unnecessary wave is represented by one point (optimum point) in this coordinate system. To search for this optimum point according to the principle of this invention, a large number of monitoring points are set in a matrix wherein the points are spaced apart from each other at a predetermined pitch ΔA1 along the axis of the amplitude A within a predetermined range from Astart to Aend, and at a predetermined pitch ΔP1 along the axis of the phase P within a predetermined range from Pstart to Pend, as indicated in FIG. 10. At each of the monitoring points, the strength of the signal which is received by the RSSI circuit 148 and which may include an unnecessary wave (leakage signal) is detected by the RSSI circuit 148, and one of the monitoring points at which the measured strength value is the smallest is determined as the optimum point.

In the present third embodiment, a primary search is initially implemented within a comparatively wide primary amplitude search range (Astart to Aend) and within a comparatively wide primary phase search range (Pstart to Pend). The primary search is implemented at a comparatively long primary searching pitch ΔA1 along the axis of the amplitude A, and at a comparatively long primary searching pitch ΔP1 along the axis of the phase P, as indicated in FIG. 10. This primary search is a rough search for a primary optimum point (at which an optimum amplitude Abest1 and an optimum phase Pbest1 are obtained). A rough adjustment of the canceling circuit 200 is made according to this primary or rough search.

Figure 11:
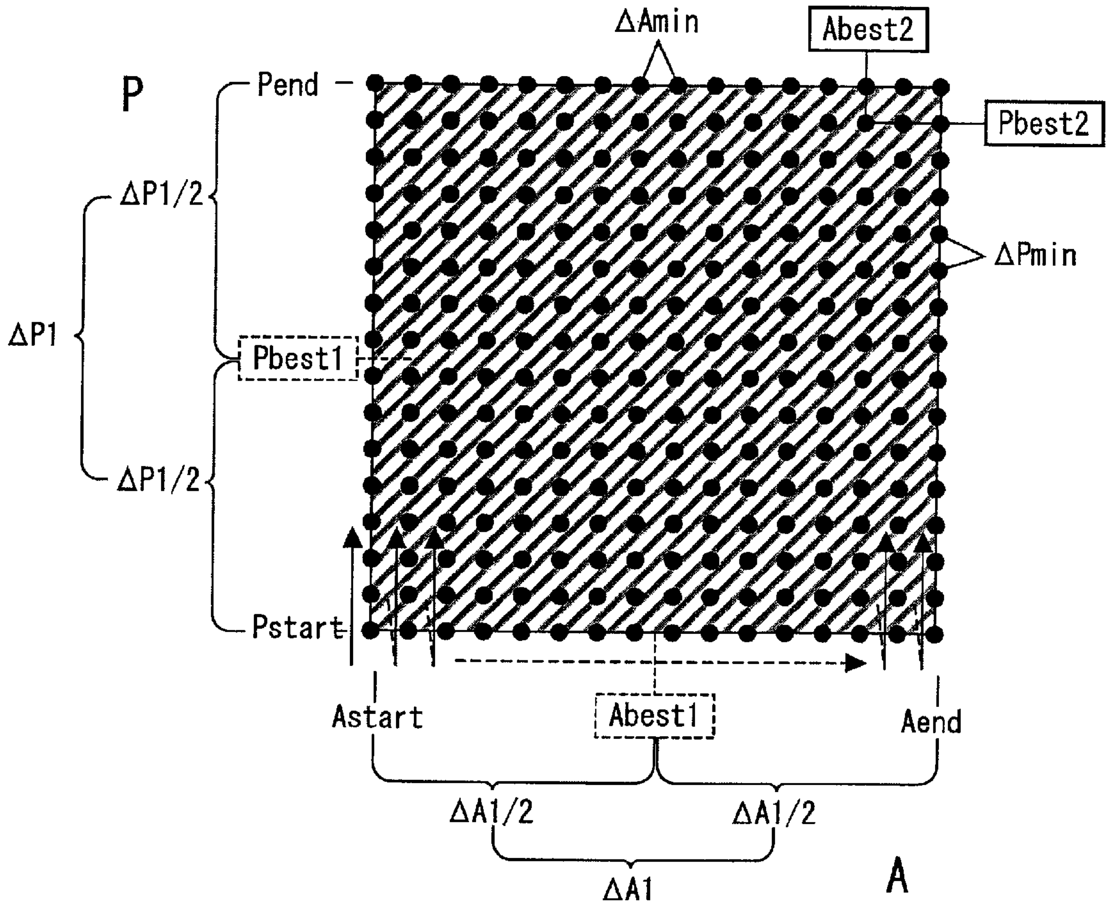
FIG. 11 is a schematic view for explaining a fine search for the optimum amplitude and phase of the cancel signal according to the present invention.

Then, a secondary search is implemented within a comparatively narrow secondary amplitude search range (Astart to Aend) and within a comparatively narrow secondary phase search range (Pstart to Pend). These secondary search ranges include the primary optimum point (Abest1, Pbest1) searched by the primary search, as an intermediate point in each of the ranges, as indicated in FIG. 11. The secondary search is implemented at a comparatively short secondary searching pitch ΔAmin along the axis of the amplitude A, and at a comparatively short secondary searching pitch ΔPmin along the axis of the phase P, as also indicated in FIG. 10. This secondary search is a fine search for a final optimum point (at which an optimum amplitude Abest2 and an optimum phase Pbest2 are obtained). A fine adjustment of the canceling circuit 200 is made according to this secondary or fine search.

In the secondary search shown in FIG. 11, the secondary amplitude search range is a distance equal to the primary searching pitch ΔA1, and includes the primary optimum amplitude point (Abest1) as a center point of the range. Namely, the secondary amplitude search range consists of a first sub-range which is equal to one half ΔA1/2 of the primary searching pitch ΔA1 and which is on one side of the center point (Abest1), and a second sub-range which is equal to the other half ΔA1/2 of the primary searching pitch ΔA1 and which is on the other side of the center point (Abest1). Similarly, the secondary phase search range consists of a first sub-range which is equal to one half ΔP1/2 of the primary searching pitch ΔP1 and which is on one side of the center point (Pbest1), and a second sub-range which is equal to the other half ΔP1/2 of the primary searching pitch ΔP1 and which is on the other side of the center point (Pbest1). However, the secondary amplitude and phase search ranges are not limited to those of FIG. 11, and may be modified as long as the secondary search ranges include the primary optimum point, and are narrower than the primary search ranges, so that the secondary search is made at shorter searching pitches than in the primary search, for fine setting of the final optimum point.

Figure 12:
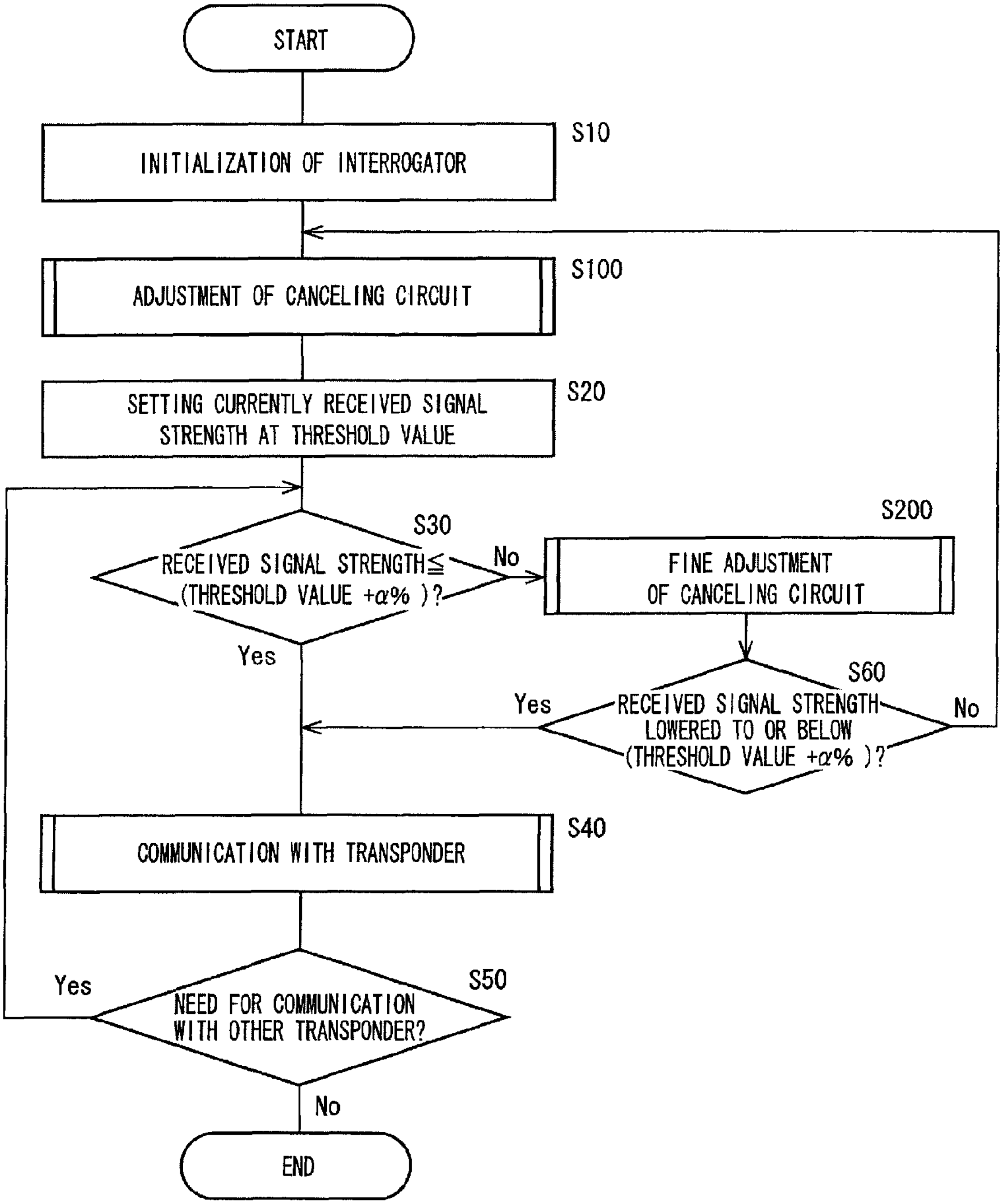
FIG. 12 is a flow chart illustrating a control routine performed by a control circuit included in the interrogator of FIG. 8.

FIG. 12 is a flow chart illustrating a control routine performed by the control circuit 104 to generate the cancel signal described above.

The control routine of FIG. 12 is initiated with step S10 in which the interrogator 100 is initialized. The initialization of the interrogator 100 includes operations to reset various parameters of the interrogator 100.

Then, the control flow goes to step S100 in which the carrier wave is generated by the transmitter portion 132 of the high-frequency circuit 102 and transmitted through the antenna 101 while the reflected signal from the circuit element To of the radio-frequency tag 14 is not received by the antenna 101. As a result, the signal received by the receiver portion 133 is applied to the RSSI circuit 148, and the strength of the received signal detected by the RSSI circuit 148 is applied to the signal processing circuit 103. On the basis of the detected strength of the received signal, the signal processing circuit 103 commands the control circuit 104 to apply the amplitude control signal and the phase control signal to the cancel-signal-amplitude control portion 201 and the cancel-signal-phase control portion 202, for thereby adjusting the amplitude and phase of the cancel signal to be generated by the canceling circuit 200, so that the strength of the received signal (the strength of the unnecessary wave or leakage signal received by the antenna 101) is minimized. This adjustment of the canceling circuit 200 to adjust the amplitude and phase of the cancel signal is made efficiently according to the rough and fine searches for the optimum point of the amplitude and phase of the cancel signal.

Then, step S20 is implemented to set the final value of the strength of the received signal detected by the RSSI circuit 148 after the adjustment of the canceling circuit 200, as a threshold value subsequently used for controlling the cancel signal. The set final value is stored in a suitable memory (e.g., RAM of the control circuit 104).

The control flow then goes to step S30 to determine whether the strength of the received signal currently detected by the RSSI circuit 148 is equal to or lower than a sum of the threshold value set in step S20 and a predetermined extra value of α % (e.g., several % to about 20%) of the threshold value.

If an affirmative determination is obtained in step S30, this indicates that the unnecessary wave is adequately eliminated by the currently adjusted cancel signal, and the control flow goes to step S40.

If a negative determination is obtained in step S30, this indicates that the cancel signal is not adequately adjusted to eliminate the unnecessary wave, and the control flow goes to step S200 to make a fine adjustment of the canceling circuit 200. Namely, the carrier wave generated by the transmitter portion 132 is transmitted through the antenna 101 while the reflected wave form the radio-frequency tag 14 is not received by the antenna 101, and the phase control signal to be applied to the cancel-signal-phase control portion 202 is adjusted to reduce the strength of the received signal detected by the RSSI circuit 148, for thereby re-adjusting the phase of the cancel signal to be generated by the canceling circuit 200. Then, step S60 similar to step S30 is implemented to determine whether the strength of the received signal currently detected by the RSSI circuit 148 has been lowered to or below the set threshold value plus the predetermined extra value of α %. This extra value of α % may be different from the extra value used in step S30. If a negative determination is obtained in step S60, this indicates that the fine adjustment of the canceling circuit 200 in step S200 is not satisfactory for adequate elimination of the unnecessary wave, and the control flow goes back to step S100 and the subsequent steps for re-adjustment of the canceling circuit 200. If an affirmative decision is obtained in step S60, this indicates that the fine adjustment of the canceling circuit 200 in step S200 is satisfactory for adequate elimination of the unnecessary wave, and the control flow goes to step S40.

In step S40, the interrogator 100 is operated for communication with the circuit element To of the transponder in the form of the radio-frequency tag 14, to read information from the IC circuit portion 65 or write desired information on the IC circuit portion 65.

Step S40 is followed by step S50 to determine whether it is necessary to communicate with the other transponder (radio-frequency tag 14). If a negative determination is obtained in step S50, the present control routine is terminated. If an affirmative determination is obtained in step S50, the control flow goes back to step S30.

Referring to the flow chart of FIG. 13, there will be described in detail the adjustment of the canceling circuit 200 in step S100 of the control routine of FIG. 12.

Figure 13:
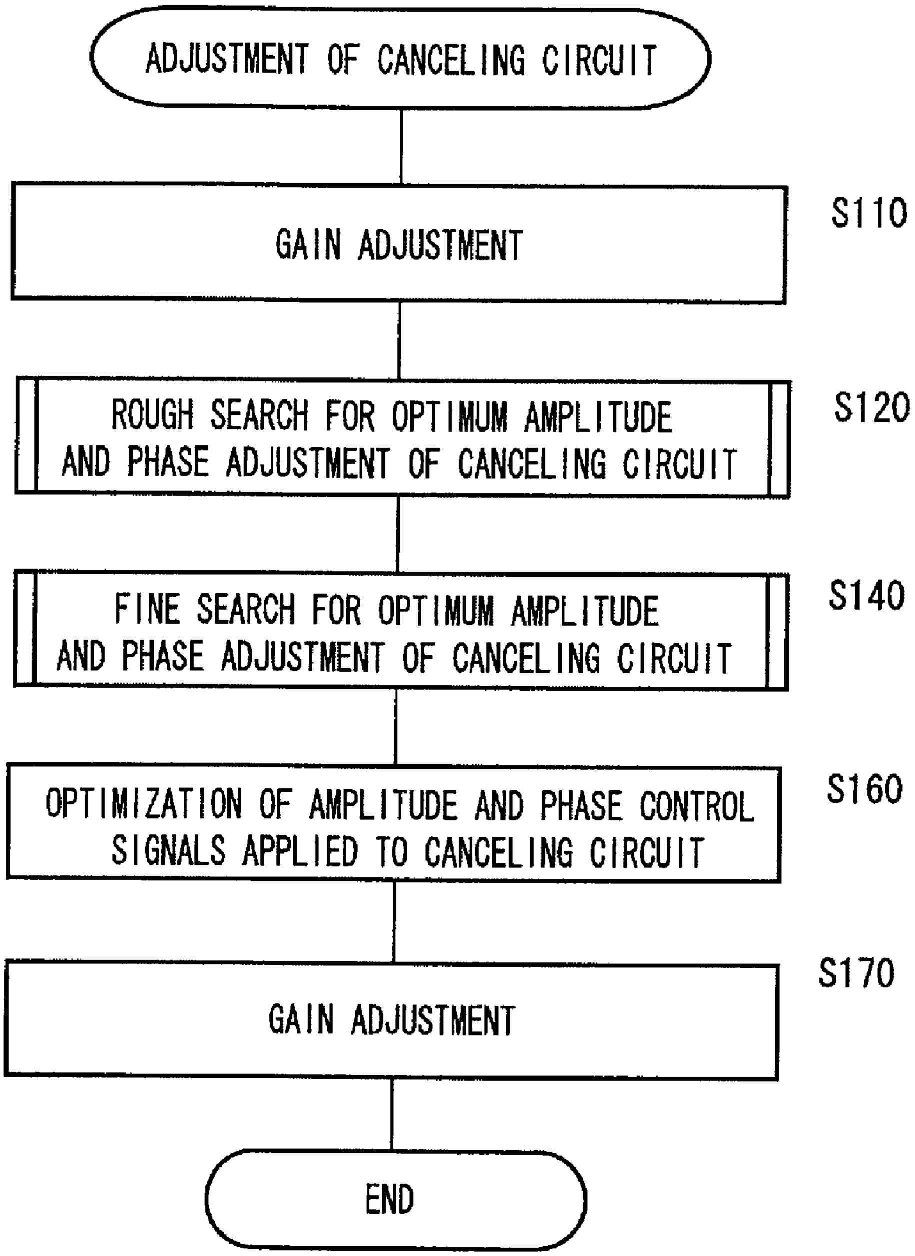
FIG. 13 is a flow chart illustrating details of step S100 in the flow chart of FIG. 12.

The control routine of FIG. 13 is initiated with step S110 to apply the control signals to the first receiver-side amplifier 143 and the second receiver-side amplifier 147, for example, for adjusting the gain of the received signals generated by these amplifiers 143, 147.

The control flow then goes to step S120 to make the rough search for optimum values of the amplitude A and phase P of the cancel signal to be generated by the canceling circuit 200. Described in detail, the amplitude A and phase P of the cancel signal are changed by changing the amplitude control signal and the phase control signal to be applied to the cancel-signal-amplitude control portion 201 and the cancel-signal-phase control portion 202 of the canceling circuit 200, by implementing the primary or rough search within the comparatively wide primary search amplitude and phase search ranges, at the comparatively long primary searching pitches, as indicated in FIG. 10, to determine the primary optimum point at which the strength of the received signal detected by the RSSI circuit 148 is the smallest.

Then, the control flow goes to step S140 to make the fine search optimum values of the amplitude A and phase P of the cancel signal to be generated by the canceling circuit 200. Described in detail, the amplitude A and phase P of the cancel signal are changed by changing the amplitude control signal and the phase control signal, by implementing the secondary or fine search within the comparatively narrow primary search amplitude and phase search ranges determined on the basis of the primary optimum point detected by the rough adjustment, as indicated in FIG. 10, to determine the final optimum point at which the strength of the received signal detected by the RSSI circuit 148 is the smallest.

Step S160 is then implemented to control the amplitude control signal and the phase control signal to be applied to the cancel-signal-amplitude control portion 201 and the cancel-signal-phase control portion 202 of the canceling circuit 200, according to the determined final optimum point indicative of the optimum amplitude value Abest2 and the optimum phase value Pbest2.

The control flow then goes to step S170 to apply the control signals to the first receiver-side amplifier 143 and the second receiver-side amplifier 147, for example, for adjusting the gain of the received signals generated by these amplifiers 143, 147, as in step S110. The control routine of FIG. 12 is terminated after step S170 is implemented.

Referring to the flow chart of FIG. 14, there will be described in detail the operation in step S120 of FIG. 13 to make the rough search for the optimum amplitude and phase of the cancel signal to be generated by the canceling circuit 200.

Figure 14:
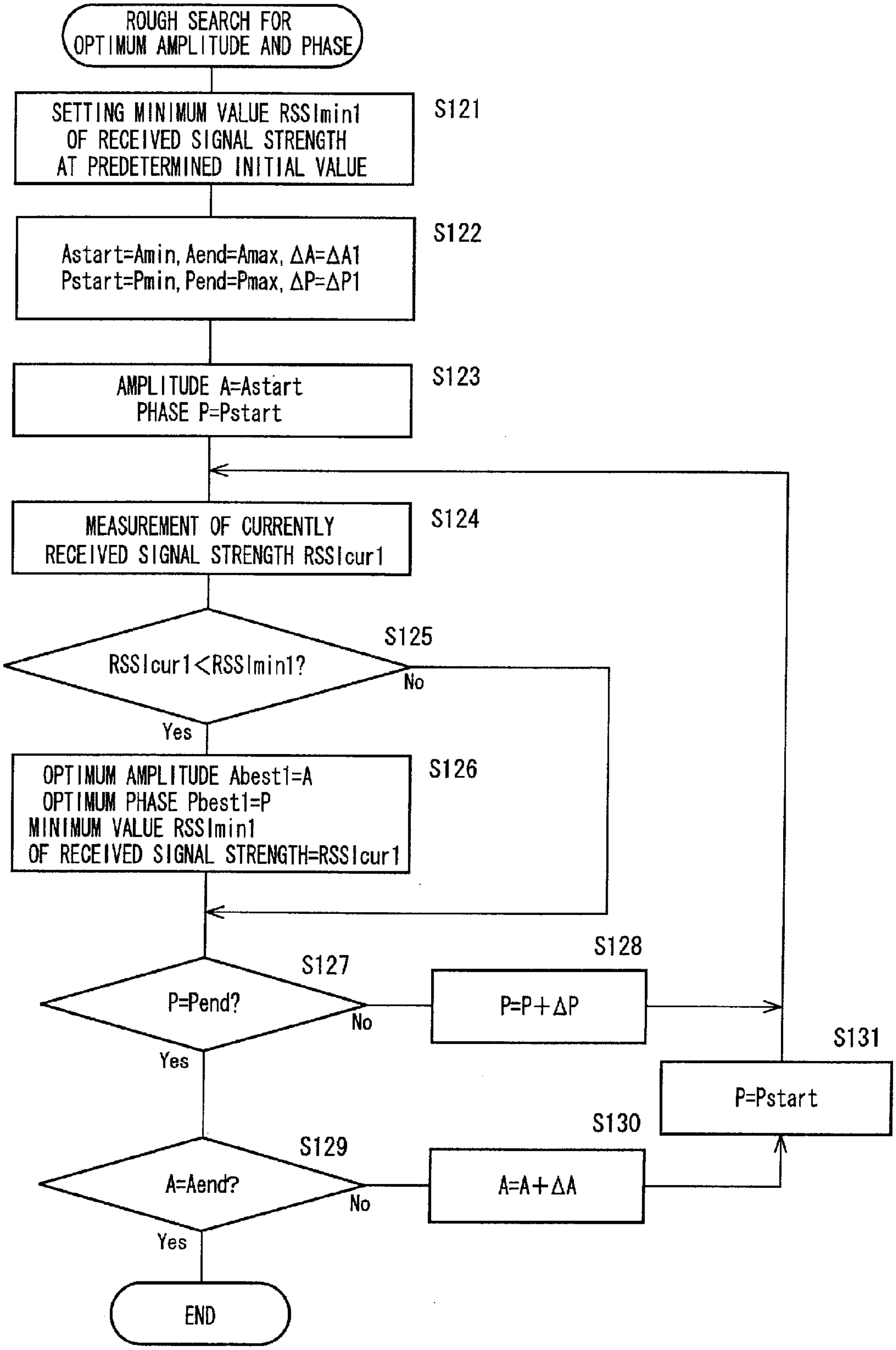
FIG. 14 is a flow chart illustrating details of step S120 in the step S100.

The control routine of FIG. 14 is initiated with step S121 to set a minimum value RSSImin1 of the strength of the received signal at a predetermined initial value (sufficiently large value). The minimum value RSSImin1 is used in step S125 which will be described.

Then, the control flow goes to step S122 to set a start value Astart and an end value Aend of the primary amplitude search range to Amin and Amax, respectively, and the primary amplitude searching pitch ΔA to ΔA1, and to set a start value Pstart and an end value Pend of the primary phase search range to Pmin and Pmax, respectively, and the primary phase searching pitch ΔP to ΔP1. The values Amin, Amax, ΔA1, Pmin, Pmax and ΔP1 may be suitably determined constant values, or variables determined each time step S122 is implemented.

Step S123 is then implemented to apply the amplitude control signal to the cancel-signal-amplitude control portion 201, so that the amplitude A of the cancel signal to be generated by the canceling circuit 200 is adjusted to the start value Astart, and to apply the phase control signal to the cancel-signal-phase control portion 202, so that the phase P of the cancel signal is adjusted to the start value Pstart.

The control flow then goes to step S124 in which the current strength value RSSIcur1 of the received signal is detected by the RSSI circuit 148, and then to step S125 to determine whether the detected strength value RSSIcur1 is lower than the minimum value RSSImin1.

If an affirmative determination is obtained in step S125, this indicates that the cancel signal has the optimum amplitude and phase, and the control flow goes to step S126 in which the current amplitude value A is set as the primary optimum value Abest1, while the current phase value P is set as the primary optimum value Pbest1, and the current value RSSIcur1 of the received signal is set as the minimum value RSSImin1. Step S126 is followed by step S127.

If a negative determination is obtained in step S126, this indicates that the current amplitude and phase values of the cancel signal are not the optimum values, and the control flow goes directly to step S127, while skipping step S126.

Step S127 is provided to determine whether the current phase value P is equal to the end value Pend of the primary phase search range. If a negative determination is obtained in step S127, the control flow goes to step S128 to increment the phase P by a predetermined value equal to the primary phase searching pitch ΔP, and goes back to step S124. If an affirmative determination is obtained in step S127, the control flow goes to step S129 to determine whether the current amplitude value A is equal to the end value Aend of the primary amplitude search range. If a negative determination is obtained in step S129, the control flow goes to step S130 to increment the amplitude A by a predetermined value equal to the primary amplitude searching pitch ΔA, and to step S131 to reset the phase P to the start value Pstart of the primary phase search range, and then goes back to step S124.

In the primary search for the optimum amplitude and phase of the cancel signal, the phase P is incremented from the start value Pstart to the end value Pend, by the incremental value of ΔP, for each amplitude value A, by repeated implementation of steps S124, S125 (S126), S127 and S128. By this incremental increase of the phase P for the same amplitude value A, the strength RSSIcur1 is monitored along a vertical straight line of monitoring points representative of the same amplitude value A, from the lowest monitoring point in the upward direction as seen in the matrix of the monitoring points shown in FIG. 10. When the phase P is increased to the end value Pend while the amplitude A has not been increased to the end value Aend, that is, when the affirmative determination is obtained in step S127 while the negative determination is obtained in step S129, the amplitude A is incremented by the incremental value of ΔA, and the phase P is reset to the start value Pstart in step S131. Then, the phase P is incremented from the start value Pstart to the end value Pend, by the incremental value of ΔP, for the incremented amplitude value A, by repeated implementation of steps S124, S125 (S126), S127 and S128. By this incremental increase of the phase P for the incremented amplitude A, the strength RSSIcur1 is monitored along a vertical straight line of monitoring points, which is next to the last monitored vertical straight line in the rightward direction as seen in FIG. 10. The monitoring of the strength RSSIcur1 described above is repeated until the amplitude A has been increased to the end value Aend. Thus, the strength RSSIcur1 is measured or detected at each of the monitoring points in the matrix within the primary amplitude search range from Astart to Aend and within the primary phase search range from Pstart to Pend. The currently measured strength RSSIcur1 at each monitoring point is compared with the currently set minimum value RSSImin1. If the currently measured strength RSSIcur1 is lower than the currently set minimum value RSSImin1, the currently measured strength RSSIcur1 is newly set as the minimum value RSSImin1, and the amplitude value A and the phase value P corresponding to the currently measured strength RSSIcur1 are newly set as the primary optimum amplitude value Abest1 and the primary optimum phase value Pbest1, respectively. Thus, the primary search for the optimum amplitude and phase values of the cancel signal c is implemented.

Figure 15:
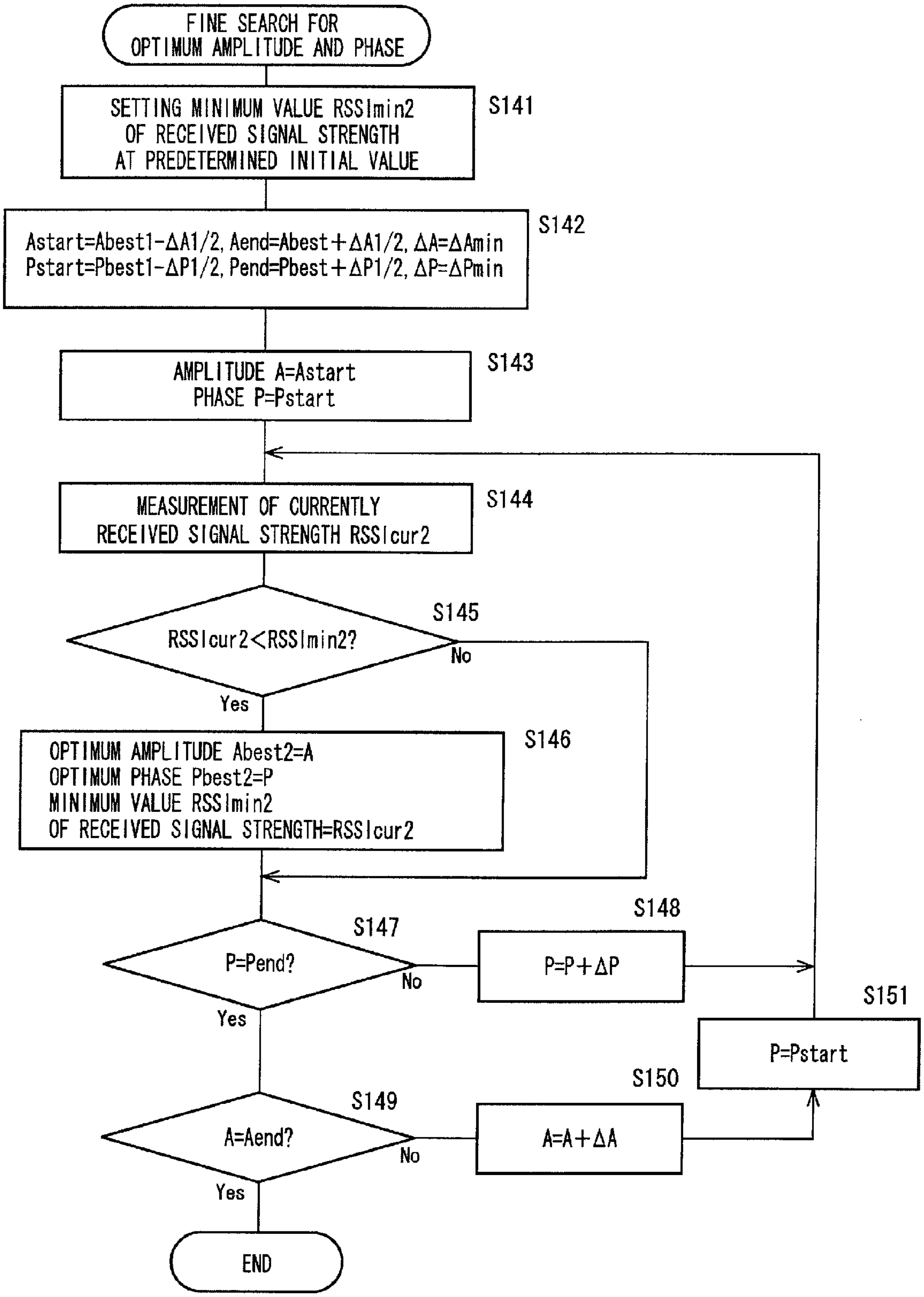
FIG. 15 is a flow chart illustrating details of step S120 in the step S100.

Referring to the flow chart of FIG. 15, there will be described in detail the operation in step S140 of FIG. 13 to make the fine search for the optimum amplitude and phase of the cancel signal to be applied The control routine of FIG. 15 is initiated with step S141 to set a minimum value RSSImin2 of the strength of the received signal at a predetermined initial value (sufficiently large value). The minimum value RSSImin2 is used in step S145 which will be described.

Then, the control flow goes to step S142 to set a start value Astart and an end value Aend of the secondary amplitude search range, by using the optimum amplitude value Abest1 and the primary amplitude searching pitch ΔA1, and to a set start value Pstart and an end value Pend of the secondary phase search range, by using the optimum phase value Pbest1 and the primary phase searching pitch ΔP1. That is, the start value Astart and the end value Aend of the primary amplitude search range are set to Abest1−ΔA1/2, and Abest1+ΔA1/2, respectively, and the start value Pstart and the end value Pend of the primary phase search range are set to Pbest1−ΔP1/2, and Pbest1+AP1/2, respectively. Further, the secondary amplitude searching pitch ΔA is set to ΔAmin (minimum value available in the system), and the secondary phase searching pitch ΔP is set to ΔPmin (minimum value available in the system).

Step S143 similar to step S123 of FIG. 14 is then implemented to apply the amplitude control signal to the cancel-signal-amplitude control portion 201, so that the amplitude A of the cancel signal is adjusted to the start value Astart, and to apply the phase control signal to the cancel-signal-phase control portion 202, so that the phase P of the cancel signal is adjusted to the start value Pstart.

The control flow then goes to step S144 in which the current strength value RSSIcur2 of the received signal is detected by the RSSI circuit 148, and then to step S145 to determine whether the detected strength value RSSIcur2 is lower than the minimum value RSSImin2.

If an affirmative determination is obtained in step S145, this indicates that the cancel signal has the optimum amplitude and phase, and the control flow goes to step S146 in which the current amplitude value A is set as the secondary optimum value Abest2, while the current phase value P is set as the secondary optimum value Pbest2, and the current value RSSIcur2 of the received signal is set as the minimum value RSSImin2. Step S146 is followed by step S147.

If a negative determination is obtained in step S146, this indicates that the current amplitude and phase values of the cancel signal are not the optimum values, and the control flow goes directly to step S147, while skipping step S146.

Step S147 is provided to determine whether the current phase value P is equal to the end value Pend of the primary phase search range. If a negative determination is obtained in step S147, the control flow goes to step S148 to increment the phase P by a predetermined value equal to the primary phase searching pitch ΔP, and goes back to step S144. If an affirmative determination is obtained in step S147, the control flow goes to step S149 to determine whether the current amplitude value A is equal to the end value Aend of the primary amplitude search range. If a negative determination is obtained in step S149, the control flow goes to step S150 to increment the amplitude A by a predetermined value equal to the primary amplitude searching pitch ΔA, and to step S151 to reset the phase P to the start value Pstart of the primary phase search range, and then goes back to step S154.

In the secondary search implemented within the secondary amplitude and phase search ranges which respectively include the primary optimum amplitude and phase values Abest1 and Pbest1, the phase P is incremented from the start value Pstart to the end value Pend, by the incremental value of ΔP, for each amplitude value A, by repeated implementation of steps S144, S145 (S146), S147 and S148. By this incremental increase of the phase P for the same amplitude value A, the strength RSSIcur2 is monitored along a vertical straight line of monitoring points representative of the same amplitude value A, from the lowest monitoring point in the upward direction as seen in the matrix of the monitoring points shown in FIG. 11. When the phase P is increased to the end value Pend while the amplitude A has not been increased to the end value Aend, that is, when the affirmative determination is obtained in step S147 while the negative determination is obtained in step S149, the amplitude A is incremented by the incremental value of ΔA, and the phase P is reset to the start value Pstart in step S151. Then, the phase P is incremented from the start value Pstart to the end value Pend, by the incremental value of ΔP, for the incremented amplitude value A, by repeated implementation of steps S144, S145 (S146), S147 and S148. By this incremental increase of the phase P for the incremented amplitude A, the strength RSSIcur2 is monitored along a vertical straight line of monitoring points, which is next to the last monitored vertical straight line in the rightward direction as seen in FIG. 11. The monitoring of the strength RSSIcur2 described above is repeated until the amplitude A has been increased to the end value Aend. Thus, the strength RSSIcur2 is measured or detected at each of the monitoring points in the matrix within the secondary amplitude search range from Astart to Aend and within the secondary phase search range from Pstart to Pend. The currently measured strength RSSIcur2 at each monitoring point is compared with the currently set minimum value RSSImin2. If the currently measured strength RSSIcur2 is lower than the currently set minimum value RSSImin2, the currently measured strength RSSIcur2 is newly set as the minimum value RSSImin2, and the amplitude value A and the phase value P corresponding to the currently measured strength RSSIcur2 are newly set as the final optimum amplitude value Abest2 and the final optimum phase value Pbest2, respectively. Thus, the secondary search for the optimum amplitude and phase values of the cancel signal c is implemented.

Referring to the flow chart of FIG. 16, there will be described in detail the fine adjustment of the canceling circuit 200 in step S200 of FIG. 12. This fine adjustment of the canceling circuit 200 is more or less similar to the fine search for the optimum amplitude and phase of the cancel signal illustrated in the flow chart of FIG. 15. Namely, the strength of the received signal is monitored by incrementing only the phase P at a comparatively short searching pitch within a comparatively narrow search range.

Figure 16:
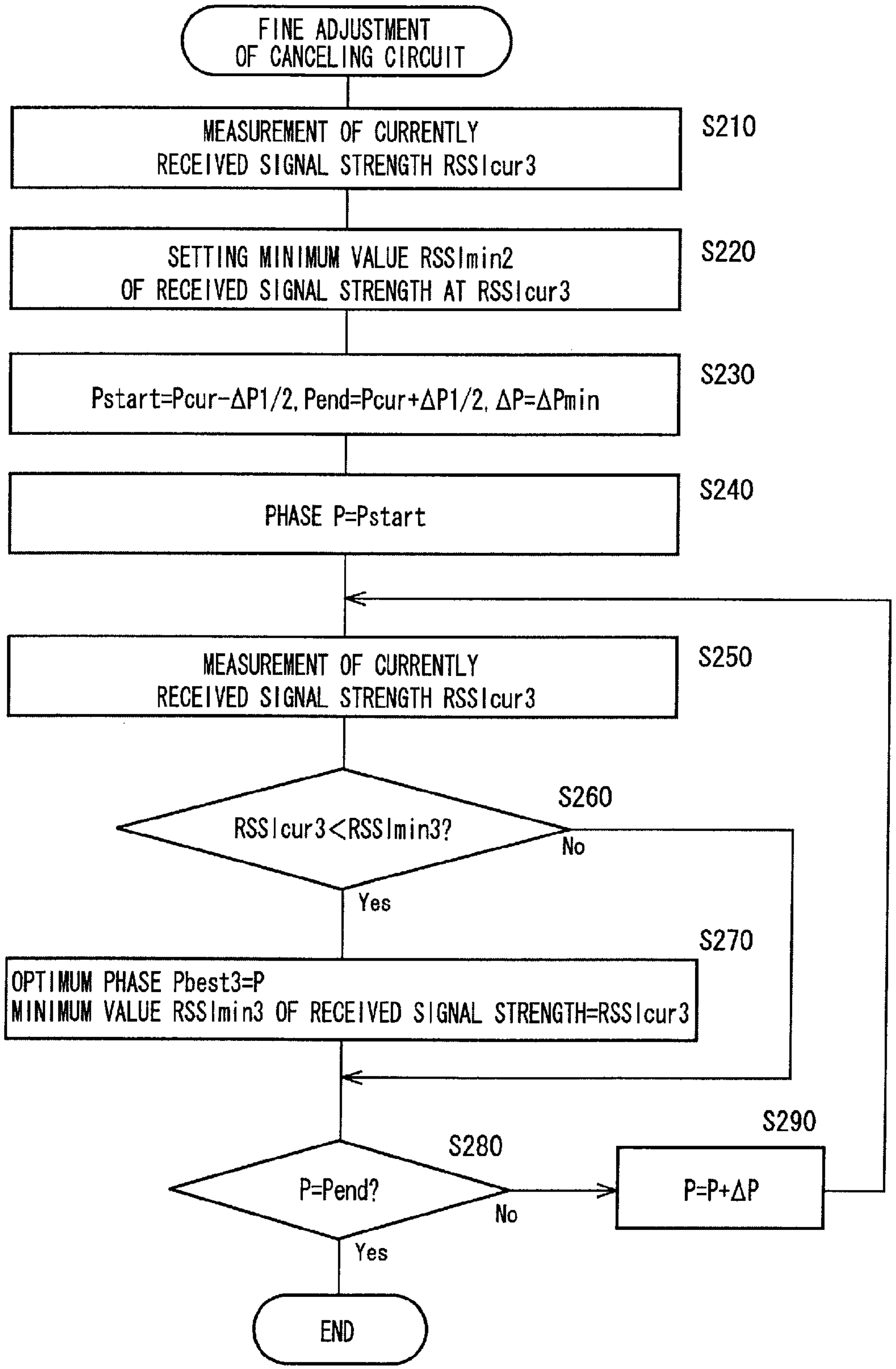
FIG. 16 is a flow chat illustrating details of step S200 in the flow chart of FIG. 12.

The control routine of FIG. 16 is initiated with step S210 in which the strength RSSIcur3 of the received signal (sum of the cancel signal and the unnecessary wave) currently received by the RSSI circuit 148 is measured by the RSSI circuit 148.

The control flow then goes to step S220 to set a minimum value RSSImin3 of the strength of the received signal at a predetermined initial value (sufficiently large value). The minimum value RSSImin3 is used in step S260 which will be described.

Then, the control flow goes to step S230 to set a start value Pstart and an end value Pend of a fine adjustment search range, by using the current amplitude value Pcur and the primary phase searching pitch ΔP1. That is, the start value Pstart and the end value Pend of the fine adjustment phase search range are set to Pcur−ΔP1/2, and Pcur+ΔP1/2, respectively. Further, a fine adjustment phase searching pitch ΔP is set to ΔPmin (minimum value available in the system).

Step S240 is then implemented to apply the phase control signal to the cancel-signal-phase control portion 202, so that the phase P of the cancel signal is adjusted to the start value Pstart.

The control flow then goes to step S250 in which the current strength value RSSIcur3 of the received signal is detected by the RSSI circuit 148, and then to step S260 to determine whether the detected strength value RSSIcur3 is lower than the minimum value RSSImin3.

If an affirmative determination is obtained in step S260, the control flow goes to step S270 in which the current phase value P is set as the fine adjustment optimum value Pbest3, and the current value RSSIcur3 of the received signal is set as the minimum value RSSImin3. Step S270 is followed by step S280.

If a negative determination is obtained in step S260, the control flow goes directly to step S280, while skipping step S270.

Step S280 is provided to determine whether the current phase value P is equal to the end value Pend of the fine adjustment phase search range. If an affirmative decision is obtained in step S280, the present control routine is terminated. If a negative determination is obtained in step S280, the control flow goes to step S290 to increment the phase P by a predetermined value equal to the fine adjustment phase searching pitch ΔP, and goes back to step S250.

In the fine adjustment of the canceling circuit 200, only the phase P is incremented from the start value Pstart to the end value Pend, by the incremental value of ΔP, for the current amplitude value Acur, by repeated implementation of steps S250, S1260 (S270), S280, and S290. By this incremental increase of the phase P, the strength RSSIcur3 is monitored at each of the monitoring points within the fine adjustment phase search range from Pstart to Pend. The currently measured strength RSSIcur3 at each monitoring point is compared with the currently set minimum value RSSImin3. If the currently measured strength RSSIcur3 is lower than the currently set minimum value RSSImin3, the currently measured strength RSSIcur3 is newly set as the minimum value RSSImin3, and the phase value P corresponding to the currently measured strength RSSIcur3 is set as a fine adjustment optimum phase value Pbest3. Thus, the fine adjustment of the canceling circuit 200 is implemented. Although the fine adjustment of the canceling circuit 200 in the present third embodiment is implemented to effect a fine adjustment of the phase P of the cancel signal, the fine adjustment may be made for only the amplitude A, or for both of the amplitude A and the phase P. In any case of the fine adjustment of the canceling circuit 200, the monitoring search is preferably implemented within the fine adjustment search range which is narrower that the primary or rough search range, and at the fine adjustment searching pitch smaller than the primary searching pitch.

Figure 17:
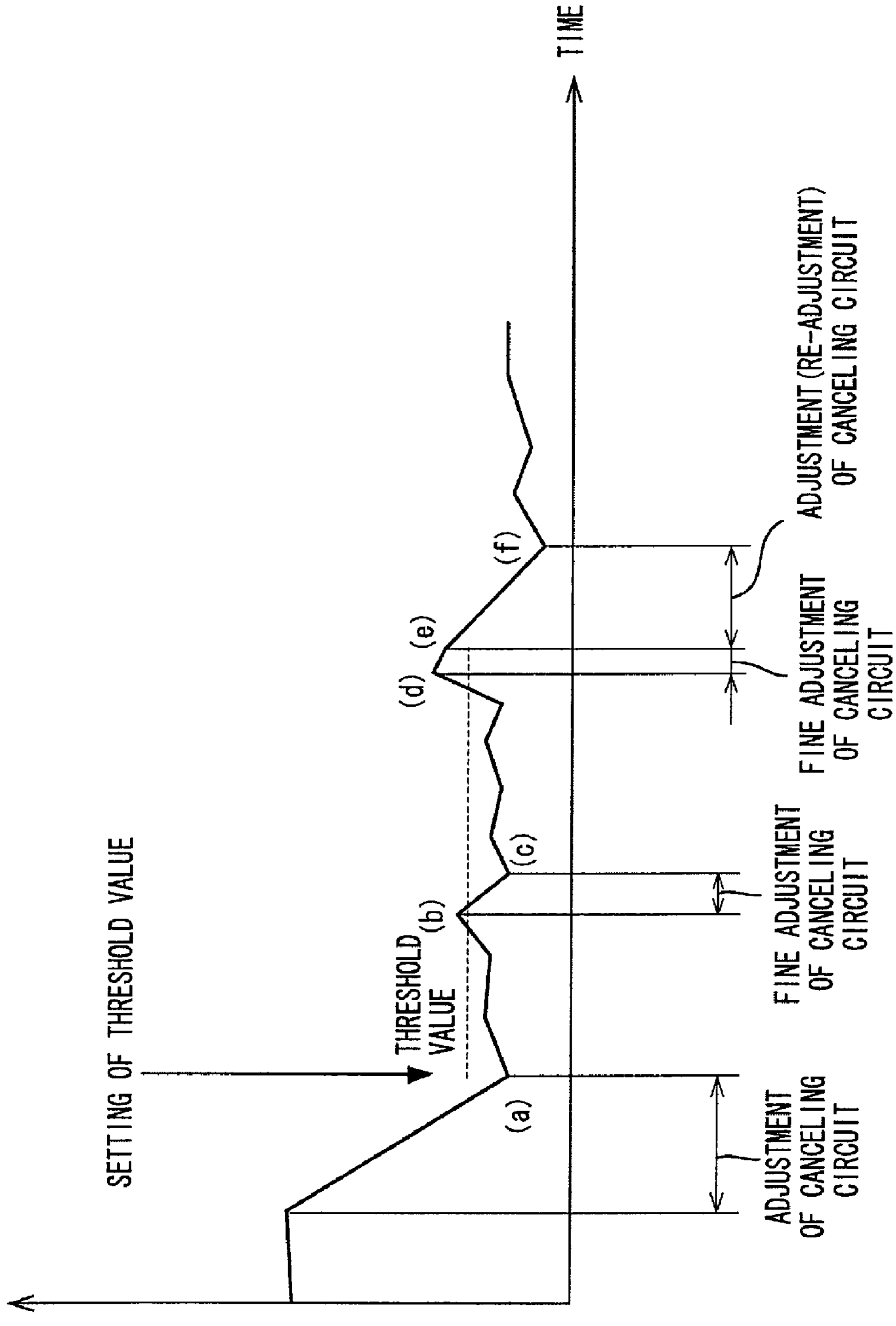
FIG. 17 is a view indicating an example of a change of the strength of a received signal detected by an RSSI circuit shown in FIG. 9.

Referring to FIG. 17, there is shown a change of the strength RSSI of the received signal detected by the RSSI circuit 148, as a result of the adjustments of the canceling circuit 200 described above. In this figure, the time is taken along the horizontal axis while the signal strength RSSI is taken along the vertical axis.

As shown in FIG. 17, the signal strength RSSI is considerably reduced from an initial value, as indicated at (a) in FIG. 17, as a result of the first adjustment of the canceling circuit 200 in step S100 of FIG. 12. If the signal strength RSSI exceeds the threshold value by the predetermined α % or more due to a change in the operating environment of the interrogator 100, for instance, as indicated at (b) in FIG. 17, the fine adjustment of the canceling circuit 200 in step S200 of FIG. 12 is implemented, so that signal strength RSSI is reduced below the threshold value, as indicated at (c) in FIG. 17. If the signal strength RSSI again exceeds the threshold value by a large amount, as indicated at (d) in FIG. 17, the fine adjustment of the canceling circuit 200 is again implemented. If the signal strength RSSI is not reduced below the threshold value plus the predetermined α %, as indicated at (e), the adjustment of the canceling circuit 200 in step S12 of FIG. 12 is again implemented, so that the signal strength RSSI is reduced below the threshold value, as indicated at (f) in FIG. 17.

It will be understood from the foregoing description of the third embodiment that the quartz oscillator 135, PLL 136 and VCO 137 cooperate to function as a carrier generating portion operable to generate the carrier wave, and the transmitter-side multiplying circuit 138 functions as a carrier modulating portion operable to modulate the carrier wave, while the antenna 101 and the transmission/reception separating portion 134 cooperate to function as a carrier transmitting portion operable to transmit the modulated carrier wave, and cooperate with the receiver portion 133 to function as a signal receiving portion operable to receive a signal. It will also be understood that the transmitter portion 132 functions as a carrier output portion including the carrier generating portion and the carrier modulating portion, and the RSSI circuit 148 functions as a signal-strength detecting portion operable to detect the strength of the received signal received by the signal-receiving portion, while the canceling circuit 200 functions as a cancel-signal generating portion operable to generate the cancel signal. It will further be understood that the control circuit 104 functions as a cancel-signal control portion operable to control the carrier generating portion, the carrier transmitting portion and the cancel-signal generating portion, such that the phase and amplitude of the cancel signal generated by the cancel-signal generating portion are changed and optimized, on the basis of the strength of the received signal which is detected by the signal-strength detecting portion when the received signal is received by the signal receiving portion while the carrier wave generated by the carrier generating portion is transmitted from the carrier transmitting portion, without transmission of the carrier wave modulated by the carrier modulating portion from the carrier transmitting portion.

It will also be understood that a portion of the control circuit 104 assigned to implement the rough search for the optimum values of the amplitude and phase of the cancel signal according to the control routine of FIG. 14 constitutes a first searching portion operable to change values of the phase and amplitude of the cancel signal within respective primary phase and amplitude search ranges at respective primary phase and amplitude searching pitches, for the signal-strength detecting portion to detect values of the strength of the received signal at respective primary monitoring points defined by respective sets of the changed values of the phase and amplitude of the cancel signal, to search for primary optimum values of the phase and amplitude, while a portion of the control circuit 104 assigned to implement the fine search for the optimum values of the amplitude and phase of the cancel signal according to the control routine of FIG. 15 constitutes a second searching portion operable to change values of the phase and amplitude of the cancel signal within respective secondary phase and amplitude search ranges at respective secondary phase and amplitude searching pitches, for the signal-strength detecting portion to detect values of the strength of the received signal at respective secondary monitoring points defined by respective sets of the changed values of the phase and amplitude of the cancel signal, to search for final optimum values of the phase and amplitude, the secondary phase and amplitude search ranges being respectively narrower than the primary phase and amplitude search ranges and respectively including the primary optimum values, and the secondary phase and amplitude searching pitches being respectively smaller than the primary phase and amplitude searching pitches.

It will further be understood that a portion of the control circuit 104 assigned to implement step S30 of the control routine of FIG. 12 constitutes a first determining portion operable to determine whether a current set value of at least one of the phase and amplitude of the cancel signal should be changed, on the basis of the strength of the received signal detected by the signal-strength detecting portion, and that the sum of the predetermined threshold value and the predetermined α % used in step S30 corresponds to a first threshold of the strength of the received signal, which first threshold is set after the final optimum values of the phase and amplitude of the cancel signal have been set.

It will also be understood that a portion of the control circuit 104 assigned to implement the fine adjustment of the canceling circuit 200 according to the control routine of FIG. 16 constitutes a control-signal generating portion operable to supply the cancel-signal generating portion with a control signal for changing at least one of the phase and amplitude of said cancel signal, when said first determining portion has determined that the currently set value of said at least one of the phase and amplitude of said cancel signal should be changed.

It will further be understood that a portion of the control circuit 104 assigned to implement step S60 of the control routine of FIG. 12 constitutes a third determining portion operable to determine whether currently set values of the phase and amplitude of the cancel signal should be changed again, on the basis of the strength of the received signal detected by the signal-strength detecting portion after the currently set value of at least one of the phase and amplitude of the cancel signal is changed according to the determination by the first determining portion that the currently set value of the at least one of the phase and amplitude should be changed. It will also be understood that a portion of the control circuit 104 assigned to implement step S40 of the control routine of FIG. 12 constitutes a transmission/reception control portion operable to control the carrier transmitting portion to transmit toward the transponder the carrier wave modulated by the carrier modulating portion, immediately after an operation of the cancel-signal control portion for controlling the carrier generating portion, and to control the signal receiving portion to receive a reply signal transmitted from the transponder in response to the modulated carrier wave received from the carrier modulating portion.

It will further be understood that a portion of the control circuit 104 assigned to implement step S30 of the control routine of FIG. 12 constitutes a first determining portion operable to determine whether a currently set value of at least one of the phase and amplitude of the cancel signal should be changed, on the basis of the strength of the received signal detected by the signal-strength detecting portion. It will also be understood that the sum of the threshold value and the predetermined α %, which is used in step S30, corresponds to a first threshold which is set after optimum values of the phase and amplitude of the cancel signal have been set by the cancel-signal control portion, and on the basis of a strength of the received signal which corresponds to the optimum values.

It will also be understood that a portion of the control circuit 104 assigned to implement the control routine of FIG. 16 for the fine adjustment of the canceling circuit 200 constitutes a control-signal generating portion operable to supply the cancel-signal generating portion with a control signal for changing at least one of the phase and amplitude of the cancel signal when the first determining portion has determined that the currently set value of the at least one of the phase and amplitude of the cancel signal should be changed.

It will further be understood that a portion of the control circuit 104 assigned to implement step S60 of the control routine of FIG. 12 constitutes a third determining portion operable to determine whether currently set values of the phase and amplitude of the cancel signal should be changed again, on the basis of the strength of the received signal detected by the signal-strength detecting portion after the currently set value of at least one of the phase and amplitude of the cancel signal is changed according to the determination by the first determining portion that the currently set value of the at least one of the phase and amplitude should be changed. It will also be understood that a portion of the control circuit 104 assigned to implement step S40 of the control routine of FIG. 12 constitutes a transmission/reception control portion operable to control the carrier transmitting portion to transmit toward the transponder the carrier wavet modulated by the carrier modulating portion, immediately after an operation of the cancel-signal control portion for controlling the carrier generating portion, and to control the signal receiving portion to receive a reply signal transmitted from the transponder in response to the modulated carrier wave received from the carrier modulating portion through the carrier transmitting portion.

In the interrogator 100 constructed as described above according to the third embodiment of this invention, the canceling circuit 200 is adjusted in step S100 in the flow chart of FIG. 12 before communication of the interrogator 100 with the radio-frequency tag 14 in step S40. Described in detail, the control circuit 104 commands the transmitter 132 of the high-frequency circuit 102 to transmit the non-modulated carrier wave through the antenna 101. During the transmission of this carrier wave, a part of the carrier wave transmitted from the antenna 101 is received as the unnecessary wave by the receiver portion 133 of the high-frequency circuit 102. This unnecessary wave is at least partially eliminated by the cancel signal generated by the canceling circuit 200. Since the modulated carrier wave is not transmitted toward the radio-frequency tag 14 during the adjustment of the canceling circuit 200, a reply signal from the radio-frequency tag 14 is not received by the receiver portion 133. Accordingly, the received signal received by the receiver portion 133 consists of the unnecessary wave. On the basis of the strength of the received signal detected by the RSSI circuit 148, the control circuit 104 applies the control signals to the cancel-signal-amplitude control portion 201 and the cancel-signal-phase control portion 202 of the canceling circuit 200, to change the phase and amplitude of the cancel signal generated, until the phase and amplitude are changed to optimum values at which the detected strength of the received signal is minimized.

Thus, the canceling circuit 200 is automatically adjusted to optimize the phase and amplitude of the cancel signal before the interrogator 100 initiates communication with the radio-frequency tag 14 (transponder). Unlike the conventional manual adjustment at a regular interval (once a year, for example), this automatic adjustment of the canceling circuit 200 can effectively eliminate the unnecessary wave in a real-time fashion even where the reception of the unnecessary wave by the receiver portion 133 changes due to a change of the operating environment of the interrogator 100. Accordingly, the cancel signal adjusted by the control circuit 104 permits a high degree of sensitivity of reception of the reply signal from the radio-frequency tag 14 during communication with the radio-frequency tag 14 in which the carrier wave modulated by the transmitter-side multiplying circuit 138 is transmitted from the transmitter portion 132 through the antenna 101 toward the radio-frequency tag 14. It is noted in particular that the communication with the radio-frequency tag 14 in step S100 of FIG. 12 to transmit the modulated carrier wave and receive the reply signal) is effected immediately after the adjustment of the canceling circuit 200 in step S100, so that the optimization of the cancel signal under the control of the control circuit 104 has a significant effect to eliminate the unnecessary wave or leakage signal.

In the adjustment of the canceling circuit 200, the primary or rough search for the primary optimum value Pbest1 of the phase P and the primary optimum value Abest1 of the amplitude A is initially implemented within the primary phase and amplitude search ranges, and the secondary or fine search for the final optimum value Pbest2 of the phase P and the final optimum value Abest2 of the amplitude A is then implemented within the secondary phase and amplitude ranges. The combination of the primary and secondary searches (rough and fine searches) permits more efficient finding of the final optimum values Pbest 2 and Abest2 of the phase P and amplitude A of the cancel signal, in a shorter length of time with a reduced operating load acting on the cancel-signal control portion.

If the detected strength of the received signal is higher than the sum of the threshold value and the predetermined α % of the threshold value even after the optimization of the phase and amplitude of the cancel signal by the rough and fine searches, it is determined in step S30 of FIG. 12 that at least one of the phase and amplitude of the cancel signal should be changed from the currently set value. In this instance, the currently set value of the phase of the cancel signal is changed again by the fine adjustment of the canceling circuit 200 according to the control routine of FIG. 16. Accordingly, the currently set value of the phase can be further optimized by the fine adjustment of the canceling circuit 200 according to a change of the operating environment of the interrogator 100.

Even after the fine adjustment, the determination is made in step S60 as to whether the phase P and amplitude A of the cancel signal should be changed again. That is, if the negative determination is obtained in step S60 due to insufficiency of the fine adjustment, the control flow goes back to step S100 to make the primary and secondary searches again to re-adjust the phase and amplitude of the cancel signal according to a change of the operating environment of the interrogator 100.

In the third embodiment described by reference to the flow chart of FIG. 12, the fine adjustment of the canceling circuit 200 is implemented in step S200 if the strength of the received signal detected after the initial adjustment of the canceling circuit 200 in step S100 is higher than the sum of the threshold value and the predetermined α %. Further, the re-adjustment in step S100 is implemented if the strength of the received signal detected after the fine adjustment is higher than the sum. However, the fine adjustment and re-adjustment of the canceling circuit 200 are not limited to those illustrated in the flow chart of FIG. 12, and may be made otherwise in the following fourth embodiment of FIGS. 18 and 19.

Embodiment 4

Referring to the flow chart of FIG. 18 corresponding to that of FIG. 12, there will be described a control routine executed by the control circuit 104 in the present fourth embodiment to adjust or control the canceling circuit 200.

Figure 18:
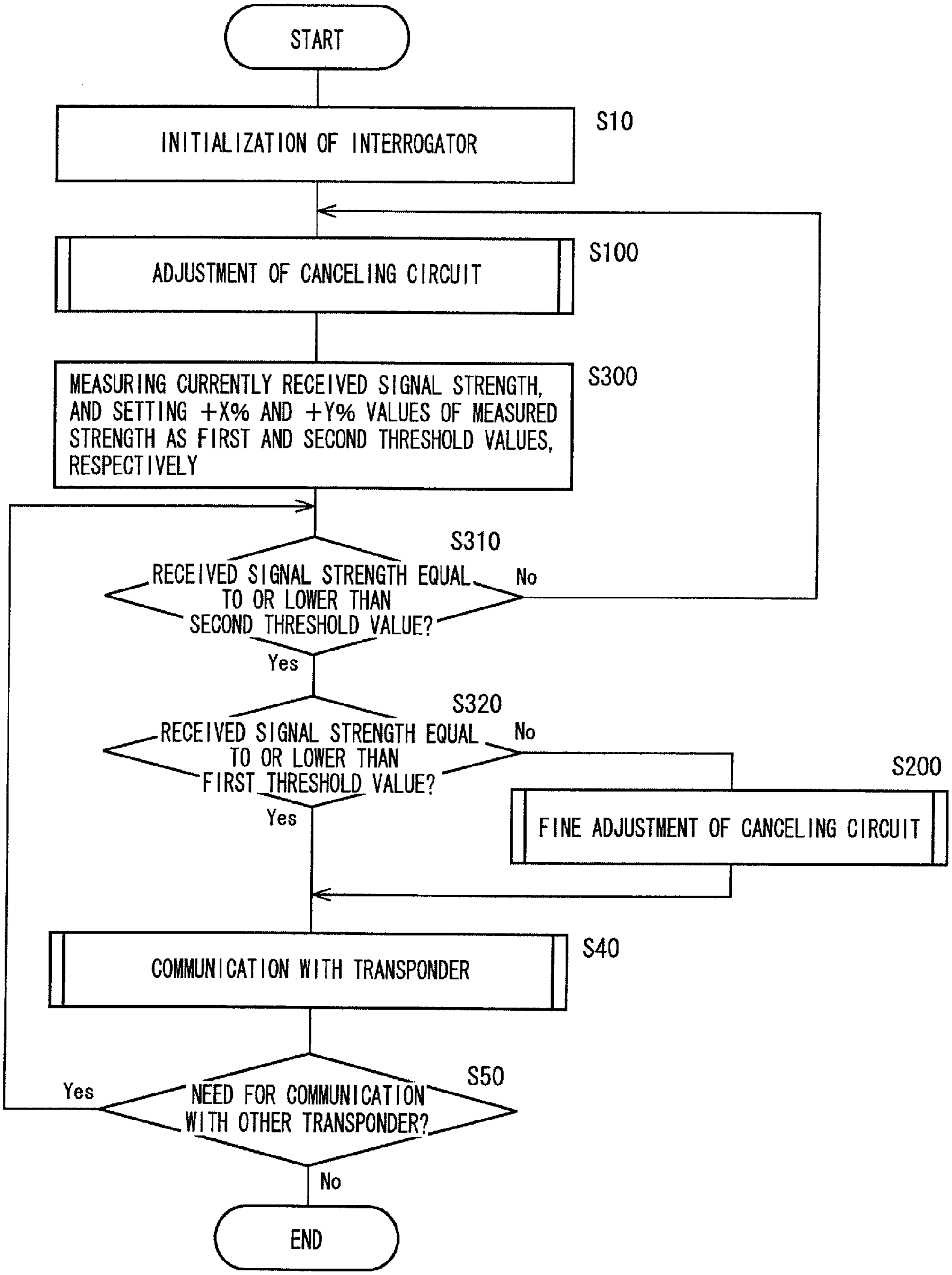
FIG. 18 is a flow chart illustrating a control routine performed by a control circuit of an interrogator according to a fourth embodiment in which a canceling circuit is fine-adjusted or re-adjusted according a result of comparison of the received signal strength with two threshold values.

The control routine of FIG. 18 is initiated with steps S10 and S100 to initialize the interrogator 100 and implement the initial adjustment of the canceling circuit 200. Step S100 is followed by steps S300, S310 and S320 which are characteristic of this fourth embodiment.

Step S300 is provided to detect or measure the strength of the received signal currently received by the RSSI circuit 148, and to set a +x % of the detected strength as a first threshold value, and set a +y % of the detected strength as a second threshold value. The x % and y % are about several % to about 20%, and the x % is lower than the y %, namely, value x<value y.

Step S300 is followed by step S310 to determine whether the strength of the received signal currently received by the RSSI circuit 148 is equal to or lower than the second threshold value set in step S300.

If a negative determination is obtained in step S310, this indicates that the detected strength of the currently received signal is higher than the comparatively large second threshold value (y % of the strength detected in step S300), and the control flow goes back to step S100 to make the re-adjustment of the canceling circuit 200. If an affirmative determination is obtained in step S310, the control flow goes to step S320.

Step S320 is provided to determine whether the strength of the received signal currently received by the RSSI circuit 148 is equal to or lower than the first threshold value (x % of the strength detected in step S300).

If a negative determination is obtained in step S320, this indicates that the currently set values of the amplitude and phase of the cancel signal slightly deviate from the optimum values for adequately eliminating the unnecessary wave (leakage signal), and the control flow goes to step S200 to make the fine adjustment of the canceling circuit 200 as described above with respect to step S200 of FIG. 12. Step S200 is followed by step S40.

If an affirmative determination is obtained in step S320, this indicates that the currently set values of the amplitude and phase of the cancel signal are optimum for adequately eliminating the unnecessary wave, and the control flow goes to step S40.

Steps S40 and S50 have been described above by reference to the flow chart of FIG. 12. Namely, the communication with the circuit element To of the transponder (radio-frequency tag) 14 is implemented to obtain an access to the transponder in question, and the determination is made as to whether it is necessary to implement the communication with any other transponder. If a negative determination is obtained in step S40, the present control routine of FIG. 18 is terminated. If an affirmative determination is obtained in step S40, the control flow goes back to sep S310 and the following steps.

Figure 19:
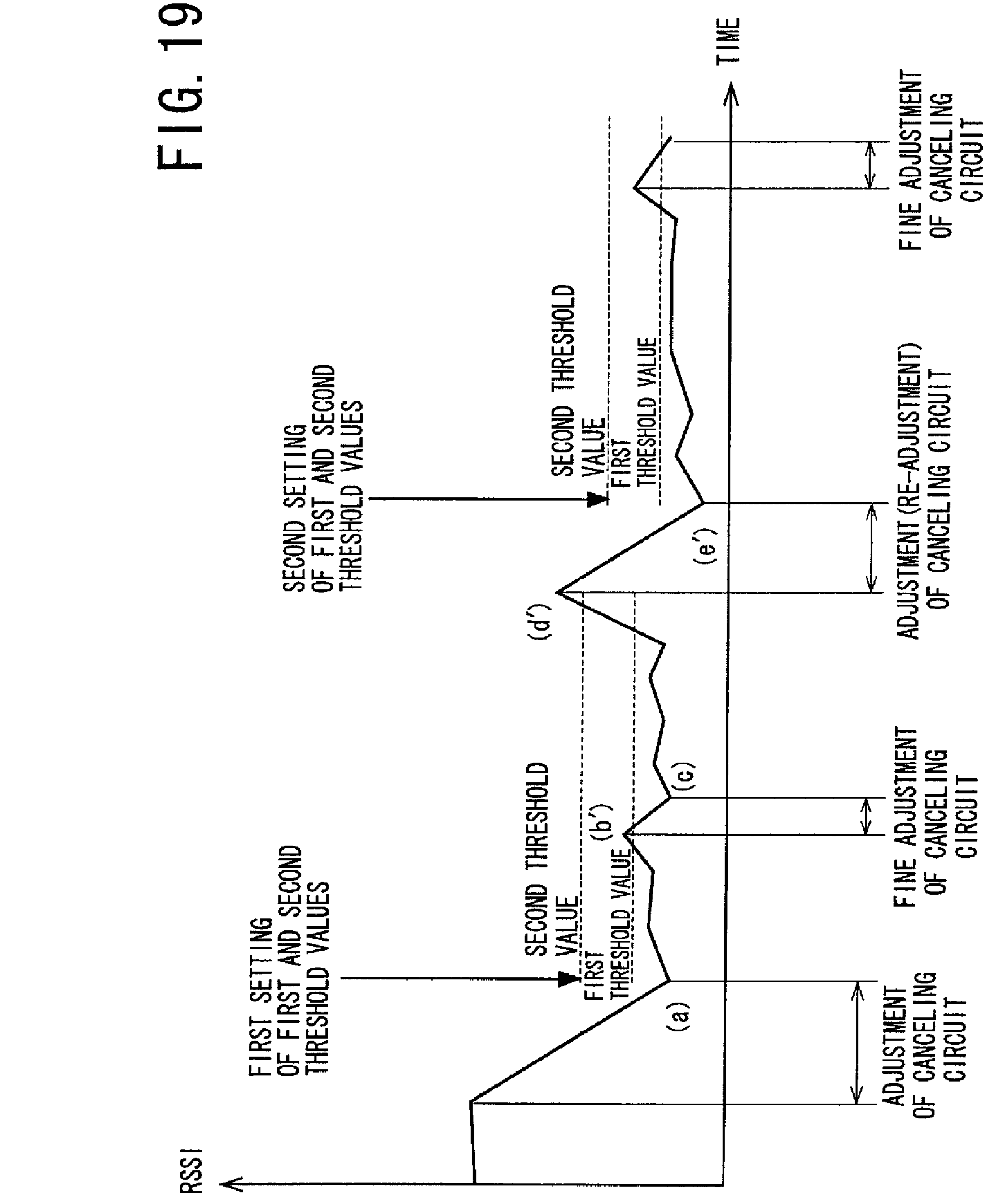
FIG. 19 is a view indicating an example of a change of an strength of a received signal detected by the RSSI circuit.

Referring to FIG. 19 corresponding to FIG. 17 showing the third embodiment, there is shown a change of the strength RSSI of the received signal detected by the RSSI circuit 148, as a result of the adjustments of the canceling circuit 200 according to the control routine of FIG. 18.

As shown in FIG. 19, the signal strength RSSI is considerably reduced from an initial value, as indicated at (a) in FIG. 19, as a result of the first adjustment of the canceling circuit 200 in step S100 of FIG. 18. If the signal strength RSSI exceeds the first threshold value due to a change in the operating environment of the interrogator 100, for instance, as indicated at (b') in FIG. 19, the fine adjustment of the canceling circuit 200 in step S200 of FIG. 18 is implemented, so that signal strength RSSI is reduced below the first threshold value, as indicated at (c) in FIG. 19. If the signal strength RSSI again exceeds the first threshold value and then the second threshold value, as indicated at (d') in FIG. 19, the re-adjustment of the canceling circuit 200 is implemented in step S100, so that the detected strength of the received signal is reduced below the first threshold value, and the first and second threshold values are set in step S300 on the basis of the last detected strength of the received signal, as indicated at (e') in FIG. 19.

It will be understood from the foregoing description of the fourth embodiment that a portion of the control circuit 104 assigned to implement step S320 of the control routine of FIG. 18 constitutes a first determining portion operable to determine whether a currently set value of at least one of the phase and amplitude of the cancel signal generated by the cancel-signal generating portion should be changed, on the basis of the strength of the received signal detected by the signal-strength detecting portion, and that a portion of the control circuit 104 assigned to implement step S310 of the control routine of FIG. 18 constitutes a second determining portion operable prior to the determination by the first determining portion, to determine whether the currently set value of at least one of the phase and amplitude of the cancel signal should be changed.

The present fourth embodiment has substantially the same advantages as the third embodiment.

In the fourth embodiment descried above, the determination by the second determining portion is made in step S310 as to whether the re-adjustment of the canceling circuit 200 is required, prior to the determination made by the first determining portion in step S320 as to whether the fine adjustment of the canceling circuit 200 is required. termination by the first determining portion is preferably a determination According to this assignment of the first and second determining portions, either the re-adjustment or the fine adjustment of the canceling circuit 200 is selectively effected according to results of the determinations by the first and second determining portions, depending upon whether the amount of deviation of the currently set values of the phase and amplitude from the optimum values at which the unnecessary wave can be most adequately eliminated. Accordingly, the phase and amplitude of the cancel signal can be optimized with a high degree of efficiency in a shorter length of time, with a reduced operating load acting on the cancel-signal control portion.

It is to be understood that the present invention may be embodied with various other changes which may occur to those skilled in the art, without departing from the spirit and scope of this invention.

What is claimed is:

1. A radio-frequency communication device arranged to transmit a transmitted signal from a transmitter antenna device toward a communication object, and to receive through a receiver antenna device a reply signal transmitted from the communication object, for radio communication with the communication object, said radio-frequency communication device comprising:

a transfer-function calculating portion configured to calculate a transfer function indicative of a relationship between a signal input to said transmitter antenna device and a signal generated by said receiver antenna device due to said signal input to said transmitter antenna device;

a receiver-circuit-constant setting portion configured to set a receiver-circuit constant for improving a quality of said reply signal received by said receiver antenna device, on the basis of said transfer function calculated by said transfer-function calculating portion, and said signal input to said transmitter antenna device; and a cancel-signal generating portion configured to generate a cancel signal, which is added to a leakage signal that is generated by said receiver antenna device due to transmission of said transmitted signal from said transmitter antenna device, for canceling the leakage signal, wherein said receiver-circuit-constant setting portion is configured to set, as said received-circuit constant, a constant for determining a phase and an amplitude of said cancel signal.

2. The radio-frequency communication device according to claim 1, further comprising a carrier generating portion configured to generate a carrier wave of said transmitted signal, and wherein said cancel-signal generating portion generates said cancel signal on the basis of said carrier wave generated by said carrier generating portion.

3. The radio-frequency communication device according to claim 1, further comprising:

a local-signal oscillator configured to generate a local signal;

a local-signal adjusting portion configured to adjust a phase and an amplitude of said local signal generated by said local-signal oscillator, on the basis of a predetermined constant; and a frequency converting portion configured to convert a frequency of said reply signal received by said receiver antenna device, by combining together said local signal the phase and amplitude of which have been adjusted by said local-signal adjusting portion, and said reply signal, and wherein said receiver-circuit-constant setting portion sets, as said receiver-circuit constant, said constant on the basis of which the phase and amplitude of said local signal are adjusted by said local-signal adjusting portion.

4. The radio-frequency communication device according to claim 3, further comprising a carrier generating portion configured to generate a carrier wave of said transmitted signal, and wherein said local-signal oscillator generates said local signal on the basis of the carrier wave generated by said carrier generating portion.

5. The radio-frequency communication device according to claim 1, wherein said transmitter antenna device consists of a plurality of transmitter antenna elements.

6. The radio-frequency communication device according to claim 1, wherein said receiver antenna device consists of a plurality of receiver antenna elements.

7. The radio-frequency communication device according to claim 1, wherein said transmitter antenna device and said receiver antenna device include at least one common transmitter/receiver antenna element.

8. The radio-frequency communication device according to claim 1, wherein said transmitter antenna device consists of a plurality of transmitter antenna elements for transmitting respective transmitted signals, said radio-frequency communication device further comprising a phased-array control portion configured to control a phase of each of the transmitted signals to be transmitted from said plurality of transmitter antenna elements, for thereby controlling a direction of transmission of the transmitted signals.

9. The radio-frequency communication device according to claim 8, wherein said receiver-circuit-constant setting portion sets said receiver-circuit constant each time the direction of transmission of the transmitted signals is changed by said phased-array control portion.

10. The radio-frequency communication device according to claim 1, wherein said transmitter antenna device consists of a plurality of transmitter antenna elements, and said receiver antenna device consists of a plurality of receiver antenna elements, said transfer-function calculating portion calculating, as said transfer function, a value obtained by dividing a transmitted-signal component included in received signals received by said receiver antenna elements, by predetermined transmitted signals to be transmitted from said transmitter antenna elements.

11. The radio-frequency communication device according to claim 1, wherein said transfer-function calculating portion calculates said transfer function at a predetermined time interval.

12. The radio-frequency communication device according to claim 1, further comprising a received-signal-quality detecting portion configured to detect a quality of a received signal received by said receiver antenna device, and said transfer-function calculating portion calculates said transfer function, depending upon the quality of the received signal detected by said received-signal-quality detecting portion.

13. The radio-frequency communication device according to claim 12, wherein said received-signal-quality detecting portion detects, as the quality of the received signal, a strength of said received signal while said reply signal transmitted from said communication object is not received by said receiver antenna device, and said transfer-function calculating portion calculates said transfer function when the strength of the received signal detected by said received-signal-quality detecting portion is equal to or higher than a predetermined threshold.

14. The radio-frequency communication device according to claim 1, wherein said receiver-circuit-constant setting portion sets said receiver-circuit constant each time said transfer-function calculating portion calculates said transfer function.

15. The radio-frequency communication device according to claim 1, wherein said communication object is a radio-frequency tag configured to transmit said reply signal including predetermined information, in response to said transmitted signal transmitted from said transmitter antenna device.

16. A radio-frequency communication device comprising:

a carrier output portion including a carrier generating portion configured to generate a carrier wave for obtaining an access to a transponder, and a carrier modulating portion configured to modulate the carrier wave generated by said carrier generating portion, said carrier output portion outputting the carrier wave from said carrier generating portion or a modulated carrier wave from said carrier modulating portion;

a carrier transmitting portion configured to transmit the carrier wave from said carrier generating portion toward said transponder;

a signal receiving portion configured to receive a signal transmitted from said transponder in response to the carrier wave received from said carrier output portion;

a cancel-signal generating portion configured to generate a cancel signal for eliminating an unnecessary wave that is a part of the carrier wave transmitted from said carrier transmitting portion, which part is received by said signal receiving portion;

a signal-strength detecting portion configured to detect a strength of a received signal which is received by said signal receiving portion and from which said unnecessary wave is at least partially eliminated by said cancel signal generated by said cancel-signal generating portion; and a cancel-signal control portion configured to control said carrier generating portion, said carrier transmitting portion and said cancel-signal generating portion, such that the carrier wave generated by said carrier generating portion is transmitted from said carrier transmitting portion, and a phase and an amplitude of said cancel signal generated by said cancel-signal generating portion are changed and optimized on the basis of the strength of said received signal, which is detected by said signal-strength detecting portion, before the modulated carrier wave modulated by said carrier modulating portion is transmitted from said carrier transmitting portion and received by said signal receiving portion.

17. The radio-frequency communication device according to claim 16, wherein said cancel-signal control portion changes the phase and amplitude of said cancel signal to optimum values, such that the strength of said received signal detected by said signal-strength detecting portion is minimized.

18. The radio-frequency communication device according to claim 17, wherein said cancel-signal control portion comprises:

a first searching portion configured to change values of the phase and amplitude of said cancel signal within respective primary phase and amplitude search ranges at respective primary phase and amplitude searching pitches, for said signal-strength detecting portion to detect values of the strength of the received signal at respective primary monitoring points defined by respective sets of the changed values of the phase and amplitude of the cancel signal, to search for primary optimum values of the phase and amplitude; and a second searching portion configured to change values of the phase and amplitude of said cancel signal within respective secondary phase and amplitude search ranges at respective secondary phase and amplitude searching pitches, for the signal-strength detecting portion to detect values of the strength of the received signal at respective secondary monitoring points defined by respective sets of the changed values of the phase and amplitude of the cancel signal, to search for final optimum values of the phase and amplitude, said secondary phase and amplitude search ranges being respectively narrower than said primary phase and amplitude search ranges and respectively including said primary optimum values, and said secondary phase and amplitude searching pitches being respectively smaller than said primary phase and amplitude searching pitches.

19. The radio-frequency communication device according to claim 16, wherein said cancel-signal control portion includes a first determining portion configured to determine whether a current set value of at least one of the phase and amplitude of said cancel signal should be changed, on the basis of the strength of the received signal detected by said signal-strength detecting portion.

20. The radio-frequency communication device according to claim 19, wherein said first determining portion determines that the currently set value of at least one of the phase and amplitude of said cancel signal should be changed, when the strength of said received signal detected by said signal-strength detecting portion is larger than a first threshold which is set after optimum values of the phase and amplitude of said cancel signal have been set by said cancel-signal control portion, and on the basis of a strength of said received signal which corresponds to said optimum values.

21. The radio-frequency communication device according to claim 20, wherein said cancel-signal control portion further includes a second determining portion configured prior to the determination by said first determining portion, to determine whether the currently set value of said at least one of the phase and amplitude of the cancel signal should be changed.

22. The radio-frequency communication device according to claim 21, wherein said second determining portion determines that the currently set value of said at least one of the phase and amplitude of said cancel signal should be changed, when the strength of said received signal detected by said signal-strength detecting portion is larger than a second threshold value which is larger than said first threshold value and which is set after the optimum values of the phase and amplitude of the cancel signal have been set by said cancel-signal control portion, and on the basis of a strength of said received signal which corresponds to said optimum values.

23. The radio-frequency communication device according to claim 19, wherein said cancel-signal control portion further includes a control-signal generating portion configured to supply said cancel-signal generating portion with a control signal for changing at least one of the phase and amplitude of said cancel signal, when said first determining portion has determined that the currently set value of said at least one of the phase and amplitude of said cancel signal should be changed.

24. The radio-frequency communication device according to claim 23, wherein said first determining portion determines whether the currently set value of the phase of said cancel signal generated by said cancel-signal generating portion should be changed, on the basis of the strength of said received signal detected by said signal-detecting portion, and said control-signal generating portion supplies said cancel-signal generating portion with said control signal to change the phase when said first determining portion has determined that the phase should be changed.

25. The radio-frequency communication device according to claim 19, wherein said cancel-signal control portion further includes a third determining portion configured to determine whether currently set values of the phase and amplitude of said cancel signal should be changed again, on the basis of the strength of the received signal detected by said signal-strength detecting portion after the currently set value of at least one of the phase and amplitude of the cancel signal is changed according to the determination by said first determining portion that the currently set value of the at least one of the phase and amplitude should be changed.

26. The radio-frequency communication device according to claim 16, wherein said cancel-signal control portion further includes a transmission/reception control portion configured to control said carrier transmitting portion to transmit toward the transponder the carrier wave modulated by said carrier modulating portion, immediately after an operation of said cancel-signal control portion for controlling said carrier generating portion, and to control said signal receiving portion to receive a reply signal transmitted from the transponder in response to the modulated carrier wave received from said carrier modulating portion through said carrier transmitting portion.

* * * * *